(12) United States Patent
Nabata et al.

(10) Patent No.: US 10,079,924 B2
(45) Date of Patent: Sep. 18, 2018

(54) ELECTRONIC DEVICE

(71) Applicant: KYOCERA CORPORATION, Kyoto (JP)

(72) Inventors: Toshihisa Nabata, Zama (JP); Satoshi Mizuta, Sagamihara (JP); Tomoaki Miyano, Kameyama (JP); Kiyokazu Sato, Yokohama (JP); Akio Kihara, Yokohama (JP); Shun Kazama, Yokohama (JP); Yasuhiro Katayama, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 114 days.

(21) Appl. No.: 14/375,773

(22) PCT Filed: Apr. 25, 2013

(86) PCT No.: PCT/JP2013/002816
§ 371 (c)(1),
(2) Date: Jul. 30, 2014

(87) PCT Pub. No.: WO2013/164907
PCT Pub. Date: Nov. 7, 2013

(65) Prior Publication Data
US 2015/0018046 A1 Jan. 15, 2015

(30) Foreign Application Priority Data

May 1, 2012 (JP) .................................. 2012-104855
May 1, 2012 (JP) .................................. 2012-104859
(Continued)

(51) Int. Cl.
H04M 1/02 (2006.01)
H04M 19/04 (2006.01)
(Continued)

(52) U.S. Cl.
CPC ............ *H04M 1/03* (2013.01); *H04B 1/3888* (2013.01); *H04M 1/0202* (2013.01);
(Continued)

(58) Field of Classification Search
CPC ...... H04M 1/035; H04M 1/03; H04M 1/0202; H04M 19/047; H04M 1/026;
(Continued)

(56) References Cited

U.S. PATENT DOCUMENTS 6,429,846 B2 * 8/2002 Rosenberg .............. A63F 13/06
345/156
6,885,753 B2 * 4/2005 Bank ........................ H04M 1/05
381/151
(Continued)

FOREIGN PATENT DOCUMENTS

CN 201134929 Y 10/2008
EP 1542064 A1 6/2005
(Continued)

OTHER PUBLICATIONS

The extended European search report issued by the European Patent Office dated Feb. 25, 2015, which corresponds to European Patent Application No. 14190392.2-1852 and is related to U.S. Appl. No. 14/375,773.
(Continued)

Primary Examiner — Fan Tsang
Assistant Examiner — Angelica M McKinney
(74) Attorney, Agent, or Firm — Studebaker & Brackett PC

(57) ABSTRACT

Provided is an electronic device that can be appropriately used as a type of electronic device that vibrates a panel attached to a housing. The electronic device includes a piezoelectric element, a panel, to which the piezoelectric element is attached, that vibrates due to the piezoelectric
(Continued)

element to generate a vibration sound transmitted by vibrating a part of a human body, a housing supporting the panel with a first face, a microphone contained within the housing and disposed on a second face, and a buffer that damps vibration transmitted from the panel to the microphone through the first face and/or the second face, thereby reducing noise picked up by the microphone.

35 Claims, 21 Drawing Sheets

(30) Foreign Application Priority Data

May 14, 2012 (JP) .................................. 2012-110920
May 18, 2012 (JP) .................................. 2012-115074

(51) Int. Cl.
| | |
|---|---|
| *H04M 1/03* | (2006.01) |
| *H04B 1/3888* | (2015.01) |
| *H04R 1/02* | (2006.01) |
| *H04R 7/04* | (2006.01) |
| *H04M 1/18* | (2006.01) |
| *H04R 1/28* | (2006.01) |
| *H04R 17/00* | (2006.01) |

(52) U.S. Cl.
CPC ......... *H04M 1/026* (2013.01); *H04M 19/047* (2013.01); *H04R 1/023* (2013.01); *H04R 7/045* (2013.01); *H04M 1/0214* (2013.01); *H04M 1/185* (2013.01); *H04R 1/2892* (2013.01); *H04R 17/00* (2013.01); *H04R 2400/03* (2013.01); *H04R 2440/05* (2013.01); *H04R 2460/13* (2013.01); *H04R 2499/11* (2013.01)

(58) Field of Classification Search
CPC ...... H04B 1/3888; H04R 1/023; H04R 7/045; H04R 3/007; G02F 1/133; G02F 1/1626; G02F 1/1622; G06F 3/016
See application file for complete search history.

(56) References Cited

U.S. PATENT DOCUMENTS

| | | | | |
|---|---|---|---|---|
| 8,200,289 | B2* | 6/2012 | Joo ....................... | G06F 1/1616 |
| | | | | 379/430 |
| 8,362,882 | B2* | 1/2013 | Heubel .................. | G06F 1/163 |
| | | | | 340/407.1 |
| 2002/0065102 | A1 | 5/2002 | Miyake et al. | |
| 2002/0107044 | A1* | 8/2002 | Kuwata ............... | H04M 1/0202 |
| | | | | 455/566 |
| 2002/0192463 | A1* | 12/2002 | Kiuchi .................. | B44C 1/1733 |
| | | | | 428/343 |
| 2006/0227981 | A1* | 10/2006 | Miyata .................... | G02F 1/133 |
| | | | | 381/124 |
| 2006/0232564 | A1* | 10/2006 | Nishimura .............. | G06F 3/016 |
| | | | | 345/173 |
| 2006/0286998 | A1* | 12/2006 | Fukuda .................... | H04M 1/03 |
| | | | | 455/550.1 |
| 2006/0291677 | A1 | 12/2006 | Chou | |
| 2008/0100177 | A1* | 5/2008 | Dai ......................... | G06F 3/016 |
| | | | | 310/317 |
| 2008/0267421 | A1* | 10/2008 | Atkinson ............... | H04R 3/007 |
| | | | | 381/71.2 |
| 2008/0268921 | A1* | 10/2008 | Taniguchi ........... | H04M 1/0214 |
| | | | | 455/575.1 |
| 2009/0103767 | A1* | 4/2009 | Kuroda .................... | H04R 1/02 |
| | | | | 381/388 |
| 2010/0253485 | A1* | 10/2010 | Park ...................... | G06F 1/1626 |
| | | | | 340/407.2 |
| 2010/0278362 | A1* | 11/2010 | Kim ........................ | H04M 1/03 |
| | | | | 381/151 |
| 2012/0162143 | A1* | 6/2012 | Kai ....................... | G06F 1/1626 |
| | | | | 345/177 |
| 2012/0242592 | A1* | 9/2012 | Rothkopf .............. | G06F 1/1652 |
| | | | | 345/173 |
| 2013/0250502 | A1* | 9/2013 | Tossavainen ........... | G06F 3/016 |
| | | | | 361/679.01 |
| 2013/0308798 | A1 | 11/2013 | Lee | |
| 2014/0355792 | A1 | 12/2014 | Nabata et al. | |

FOREIGN PATENT DOCUMENTS

| | | | | |
|---|---|---|---|---|
| EP | 2793486 | A1 | 10/2014 | |
| JP | 05-009059 | U | 2/1993 | |
| JP | 06-006246 | A | 1/1994 | |
| JP | 09-036940 | A | 2/1997 | |
| JP | 09-083623 | A | 3/1997 | |
| JP | 09-135286 | A | 5/1997 | |
| JP | 2001-211089 | A | 8/2001 | |
| JP | 2002-171322 | A | 6/2002 | |
| JP | 2004-187031 | A | 7/2004 | |
| JP | 2005-210402 | A | 8/2005 | |
| JP | 2005-348193 | A | 12/2005 | |
| JP | 2007-082009 | A | 3/2007 | |
| JP | 2007-166398 | A | 6/2007 | |
| JP | WO2011024713 | * | 3/2011 | .......... G06F 1/1626 |
| JP | WO 2011024713 | A1 * | 3/2011 | .......... G06F 1/1626 |
| JP | 2011-091719 | A | 5/2011 | |
| KR | 10-1068254 | B1 | 9/2011 | |

OTHER PUBLICATIONS

The extended European search report issued by the European Patent Office dated Feb. 25, 2015, which corresponds to European Patent Application No. 14190390.6-1852 and is related to U.S. Appl. No. 14/375,773.

International Search Report; PCT/JP2013/002816; dated Aug. 6, 2013.

Written Opinion of the International Searching Authority; PCT/JP2013/002816; dated Aug. 6, 2013; with concise explaination.

* cited by examiner

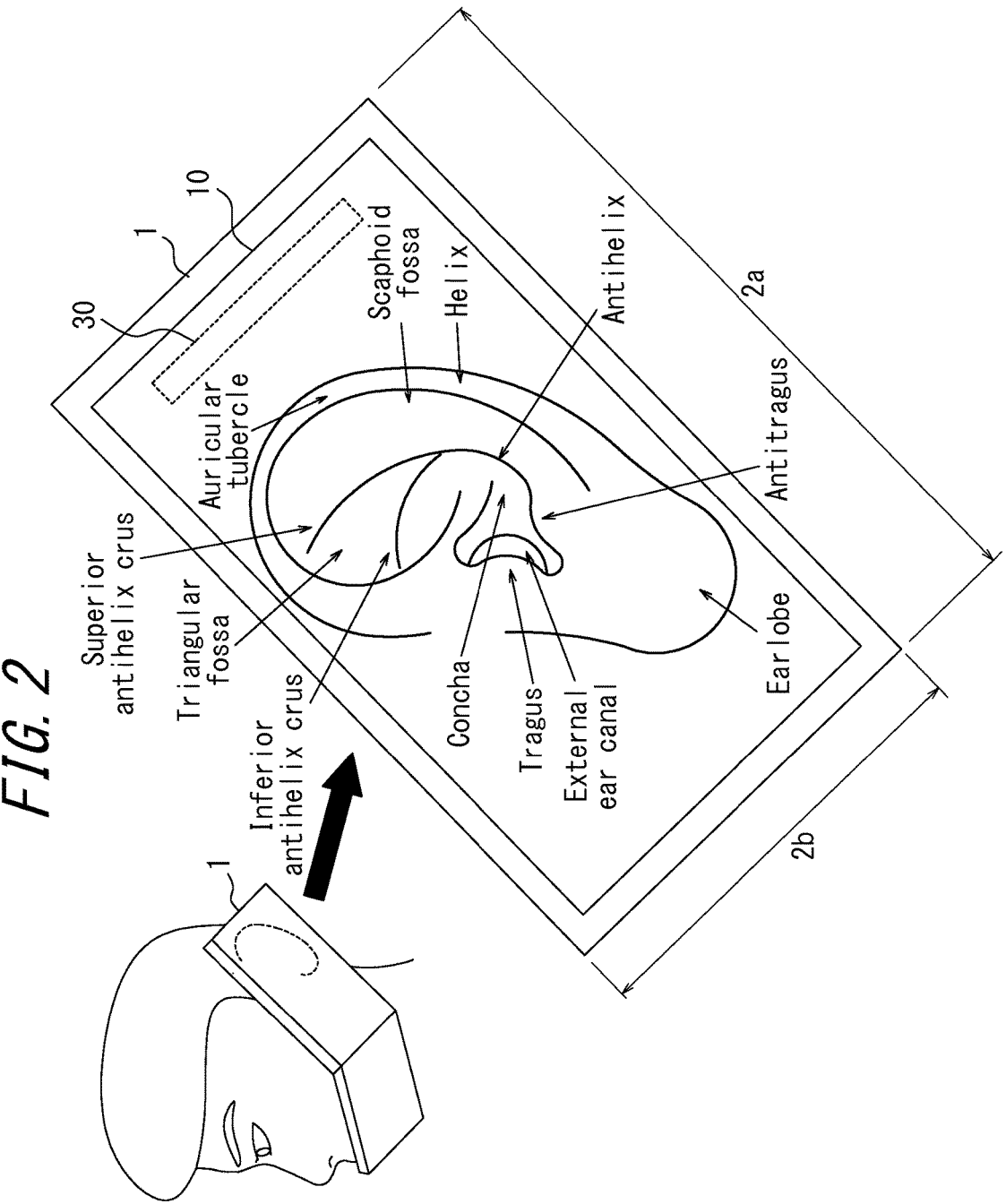

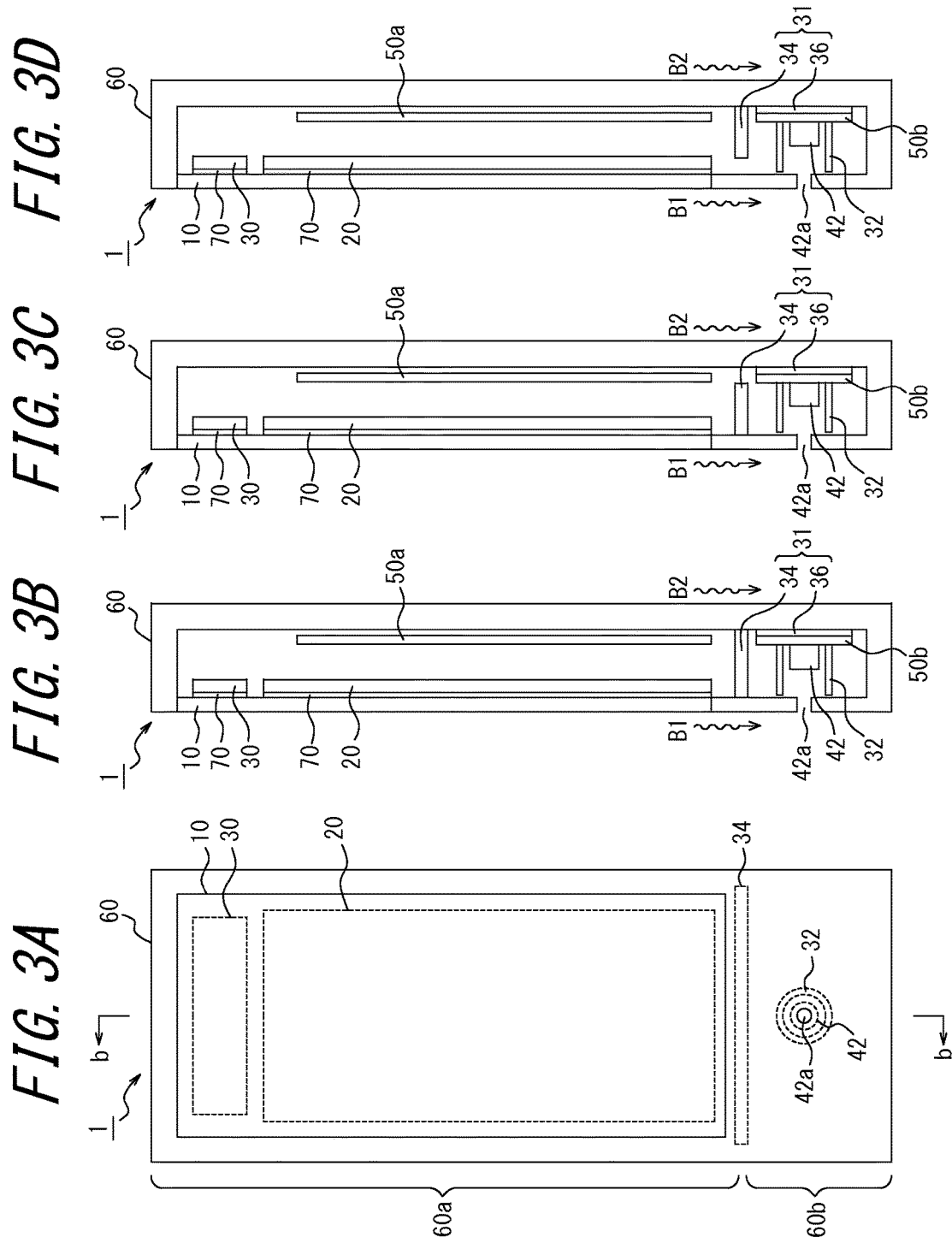

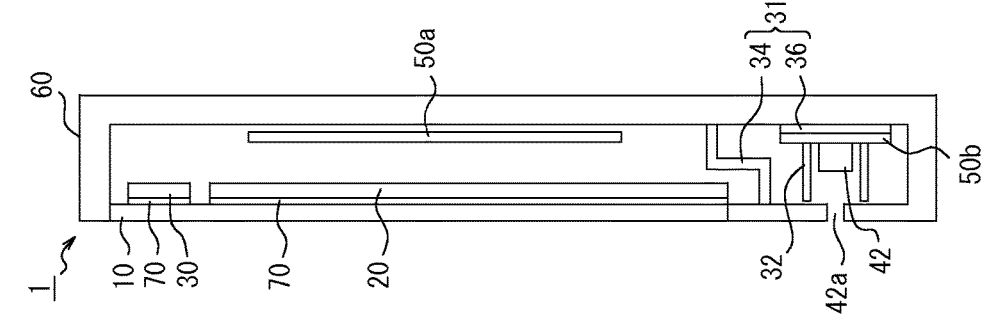
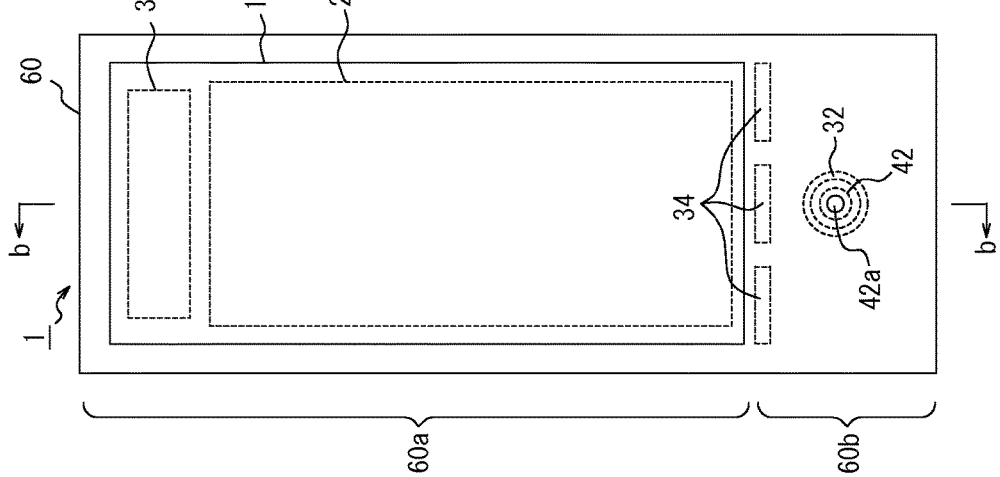
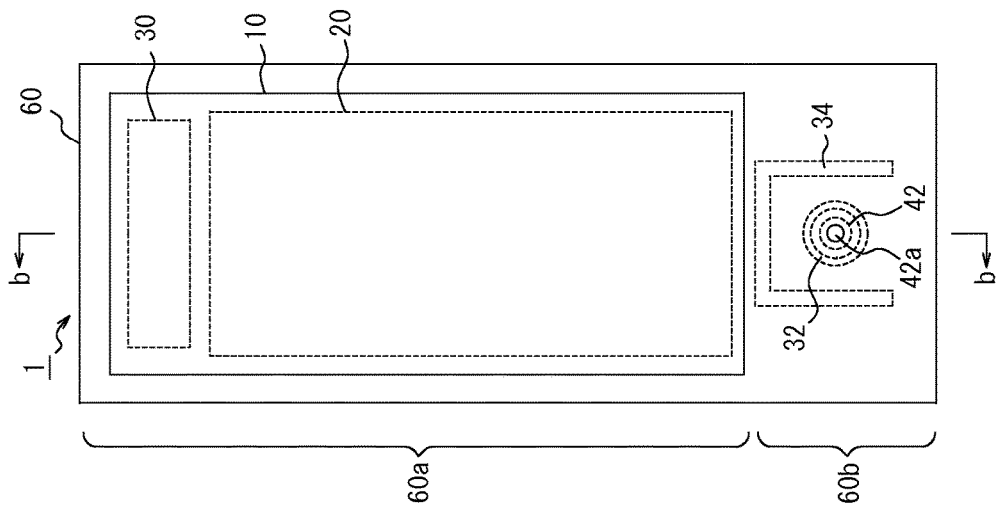

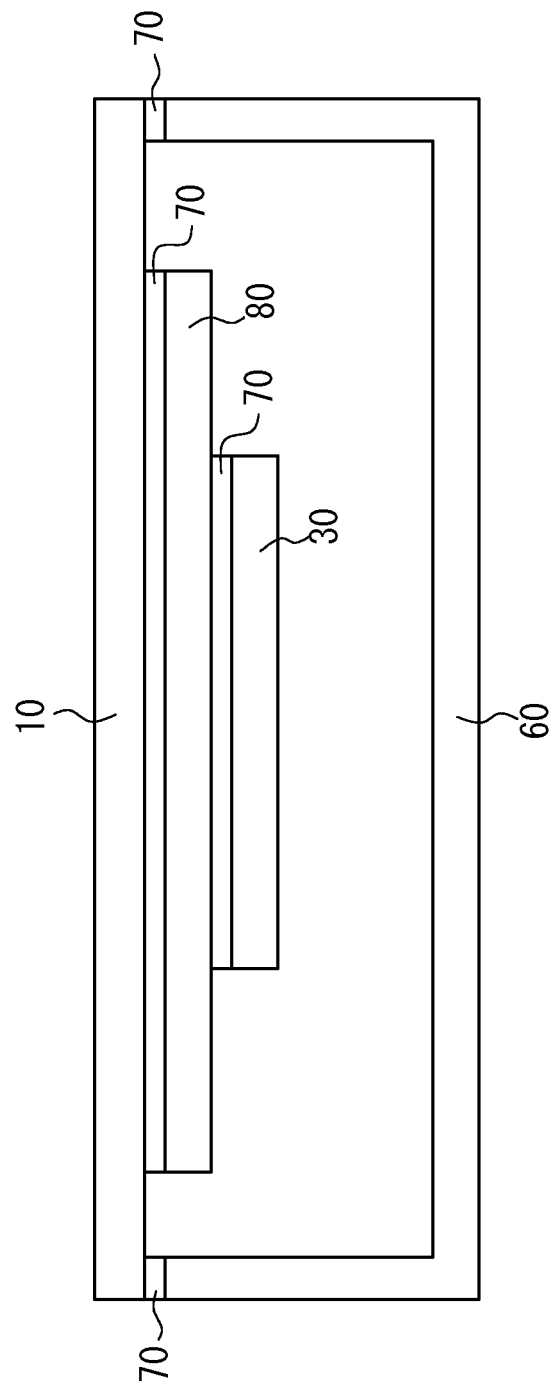

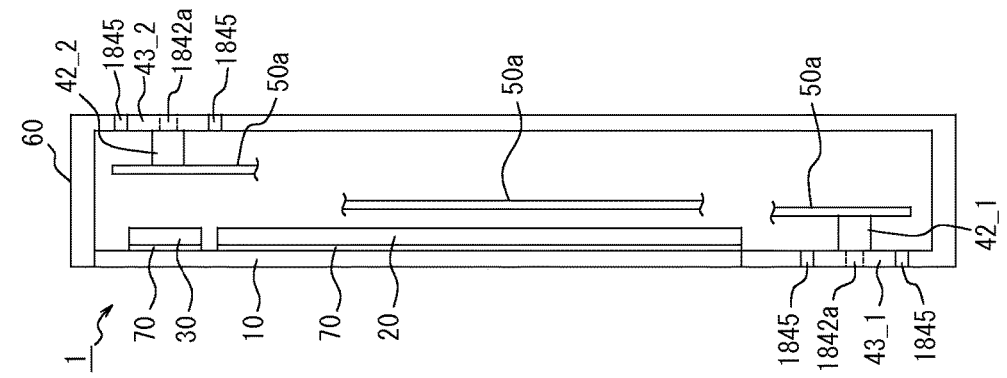
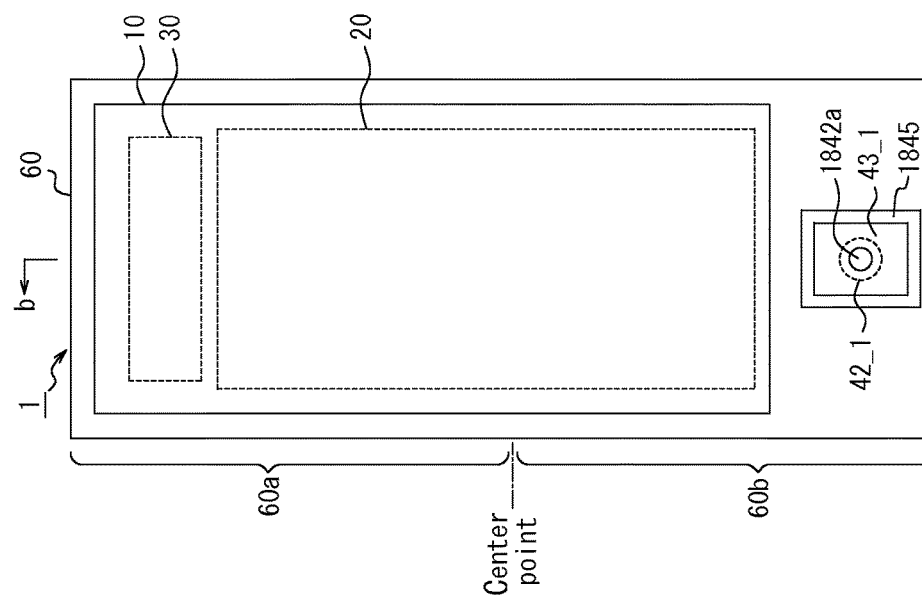

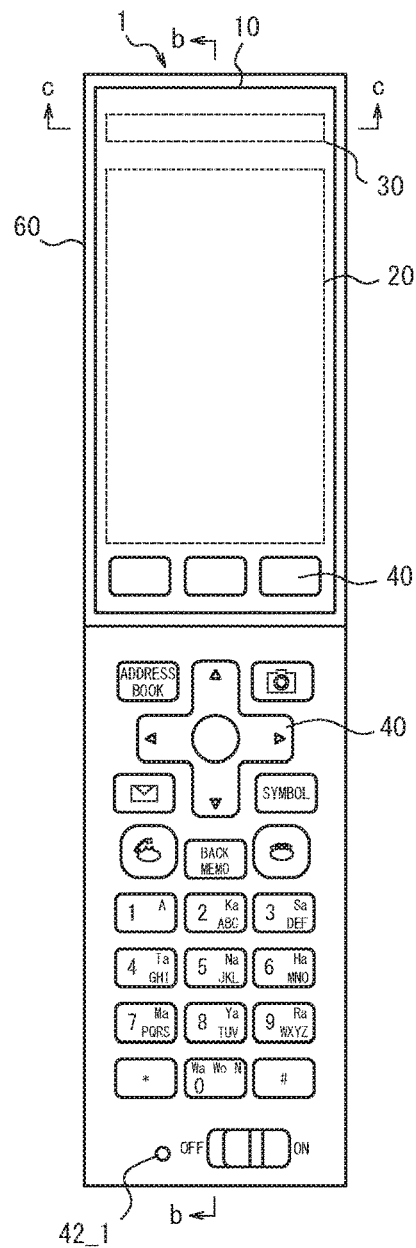
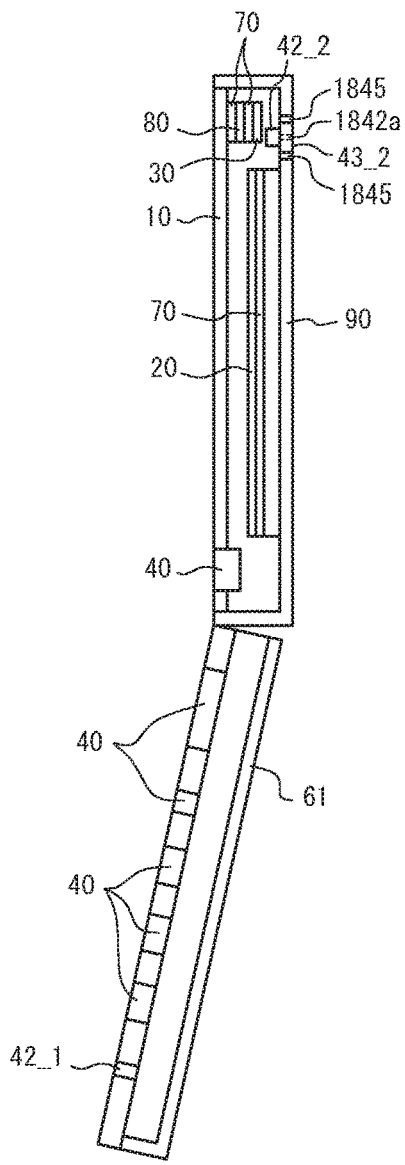
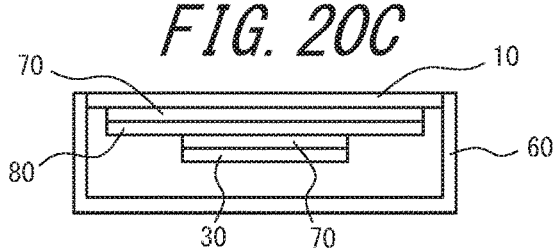

ELECTRONIC DEVICE

CROSS-REFERENCE TO RELATED APPLICATIONS

This application claims priority to and the benefit of Japanese Patent Application No. 2012-104859 filed May 1, 2012, Japanese Patent Application No. 2012-115074 filed May 18, 2012, Japanese Patent Application No. 2012-110920 filed May 14, 2012, and Japanese Patent Application No. 2012-104855 filed May 1, 2012, the entire contents of which are incorporated herein by reference.

TECHNICAL FIELD

The present invention relates to an electronic device that vibrates a panel by applying a predetermined electric signal (audio signal) to a piezoelectric element and that transmits vibration sound to a user by transmitting the vibration of the panel to the user's body.

BACKGROUND

Patent Literature 1 recites an electronic device, such as a mobile phone or the like, that transmits air-conducted sound and human body vibration sound to a user. As the air-conducted sound, Patent Literature 1 recites a sound that is transmitted to the user's auditory nerve by air vibrations, caused by a vibrating object, that are transmitted through the external ear canal to the eardrum and cause the eardrum to vibrate. As human body vibration sound, Patent Literature 1 recites a sound that is transmitted to the user's auditory nerve through a portion of the user's body (such as the cartilage of the outer ear) that is contacting a vibrating object.

Patent Literature 1 recites a telephone in which a rectangular vibrating body, formed from a piezoelectric bimorph and a flexible substance, is attached to an outer surface of a housing via an elastic member. Patent Literature 1 also discloses that when voltage is applied to the piezoelectric bimorph in the vibrating body, the piezoelectric material expands and contracts in the longitudinal direction, causing the vibrating body to undergo bending vibration. Air-conducted sound and vibration sound are transmitted to the user when the user contacts the vibrating body to the auricle.

CITATION LIST

Patent Literature 1: JP 2005-348193 A

SUMMARY

In the electronic device disclosed in Patent Literature 1, a vibrating body is attached to the outer surface of the housing of the mobile phone or the like. Therefore, problems occurring when a panel attached to the housing is vibrated are not taken into consideration at all.

The present invention provides an electronic device that can be appropriately used as a type of electronic device that vibrates a panel attached to a housing.

An electronic device according to a first aspect of the present invention includes a piezoelectric element; a panel, the piezoelectric element being attached thereto, the panel vibrating due to the piezoelectric element to generate a vibration sound transmitted by vibrating a part of a human body; a housing supporting the panel with a first face; a microphone contained within the housing and disposed on a second face differing from the first face; and a buffer damping vibration transmitted from the panel to the microphone through the first face and/or the second face.

The first face and the second face preferably oppose each other, the buffer is preferably provided within the housing, and the electronic device preferably includes a rib extending in a direction intersecting a direction from a first side of the housing where the panel is provided to a second side of the housing where the microphone is provided.

The electronic device preferably further includes a vibration absorption member within the housing, between the microphone and the second face.

The buffer preferably includes a sound insulation wall provided within the housing and surrounding the microphone.

Along a direction from the first side to the second side, the piezoelectric element is preferably attached to the panel closer to the first side.

The panel preferably includes a display disposed toward the microphone, in plan view, from a position of attachment of the piezoelectric element.

A length of the panel in a direction from the first side to the second side is preferably equal to or greater than a length from an antitragus to an inferior antihelix crus. Furthermore, a length in a direction intersecting a direction from the first side to the second side is preferably equal to or greater than a length from a tragus to an antihelix.

The piezoelectric element is preferably joined to the panel by a joining member. Furthermore, the joining member is preferably a non-heat hardening adhesive material or double-sided tape.

The panel is preferably joined to the housing by a joining member. Furthermore, the joining member is preferably a non-heat hardening adhesive material or double-sided tape.

The panel preferably includes a display disposed toward the microphone, in plan view, from a position of attachment of the piezoelectric element.

The panel preferably forms a portion or an entirety of any one of a display, an input unit, and a cover for a display.

A portion in the panel where the piezoelectric element is joined is preferably positioned outside of a region where the panel and the display overlap.

An electronic device according to a second aspect of the present invention includes a piezoelectric element; a panel, the piezoelectric element being attached thereto, the panel vibrating due to the piezoelectric element to generate a vibration sound transmitted by vibrating a part of a human body; a housing supporting the panel; and a sound collector including a duct communicating from a surface of the housing to an interior and a microphone disposed in the interior.

The sound collector preferably includes an opening of the duct on the surface of the housing in a region other than the panel. Furthermore, the sound collector preferably includes the opening of the duct on the surface of the housing on a face intersecting the panel.

The housing preferably includes a first member supporting the panel and a second member different than the first member, the sound collector being attached to the second member.

The sound collector is preferably disposed on a second side of the housing opposite a first side of the housing on which the piezoelectric element is disposed in plan view.

A length of the panel in plan view in a direction from a side where the piezoelectric element is disposed to an opposite side is preferably equal to or greater than a length from an antitragus to an inferior antihelix crus. Furthermore, a length in a direction intersecting the above direction is preferably equal to or greater than a length from a tragus to an antihelix.

The piezoelectric element is preferably joined to the panel by a joining member. Furthermore, the joining member is preferably a non-heat hardening adhesive material or double-sided tape.

The panel is preferably joined to the housing by a joining member. Furthermore, the joining member is preferably a non-heat hardening adhesive material or double-sided tape.

The panel preferably includes a display disposed toward the microphone, in plan view, from a position of attachment of the piezoelectric element.

The panel preferably forms a portion or an entirety of any one of a display, an input unit, and a cover for a display.

A portion in the panel where the piezoelectric element is joined is preferably positioned outside of a region where the panel and the display overlap.

The panel preferably forms a portion or an entirety of any one of a display, an input unit, and a cover for a display.

An electronic device according to a third aspect of the present invention includes a piezoelectric element; a panel vibrating due to the piezoelectric element to generate a vibration sound transmitted by vibrating a part of a human body; a housing supporting the panel; a microphone mounted near a first edge of the panel on a board in the housing; and a buffer member, disposed on the board near the microphone, in contact with the first edge of the panel and buffering vibration of the first edge.

A position of attachment of the piezoelectric element on the panel or the housing is preferably near a second edge opposite the first edge.

The electronic device according to the present invention preferably further includes a sound insulation wall provided within the housing and surrounding the microphone, and the buffer member is preferably adhered to the board and the sound insulation wall.

The buffer member may be provided without being adhered to the first edge of the panel. Furthermore, the buffer member is preferably made of foam rubber.

The panel preferably includes a display disposed toward the microphone, in plan view, from a position of attachment of the piezoelectric element.

A length of the panel in a direction from the first edge to the second edge is preferably equal to or greater than a length from an antitragus to an inferior antihelix crus. Furthermore, a length in a direction intersecting a direction from the first edge to the second edge is preferably equal to or greater than a length from a tragus to an antihelix.

The piezoelectric element is preferably joined to the panel by a joining member. Furthermore, the joining member is preferably a non-heat hardening adhesive material or double-sided tape.

The panel is preferably joined to the housing by a joining member. Furthermore, the joining member is preferably a non-heat hardening adhesive material or double-sided tape.

The panel preferably forms a portion or an entirety of any one of a display, an input unit, and a cover for a display.

A portion in the panel where the piezoelectric element is joined is preferably positioned outside of a region where the panel and the display overlap.

An electronic device according to a fourth aspect of the present invention includes a piezoelectric element; a panel, the piezoelectric element being attached thereto, the panel vibrating due to the piezoelectric element to generate a vibration sound that is transmitted by vibrating a part of a human body; a housing supporting the panel; and a mounting unit fixed to the housing and having a microphone mounted thereon.

The electronic device further includes a buffer, for example made of rubber, disposed between the mounting unit and the housing and buffering vibration of the housing transmitted from the panel.

The mounting unit is preferably disposed on a second side of the housing opposite a first side of the housing on which the piezoelectric element is disposed in plan view.

The mounting unit is disposed on a second face of the housing opposite a first face of the housing by which the panel is supported. In this case, the microphone disposed on the second face picks up audio for removal from audio picked up by a microphone further disposed on the first face. Furthermore, the first microphone may be disposed on a first side of the housing on which the piezoelectric element is disposed in plan view, and the second microphone may be disposed on a second side opposite the first side. Also, an imaging unit may be further mounted on the mounting unit.

A length of the panel in plan view in a direction from a side where the piezoelectric element is disposed to an opposite side is preferably equal to or greater than a length from an antitragus to an inferior antihelix crus. Furthermore, a length in a direction intersecting the above direction is preferably equal to or greater than a length from a tragus to an antihelix.

The piezoelectric element is preferably joined to the panel by a joining member. Furthermore, the joining member is preferably a non-heat hardening adhesive material or double-sided tape.

The panel is preferably joined to the housing by a joining member. Furthermore, the joining member is preferably a non-heat hardening adhesive material or double-sided tape.

The panel preferably includes a display disposed toward the microphone, in plan view, from a position of attachment of the piezoelectric element.

The panel preferably forms a portion or an entirety of any one of a display, an input unit, and a cover for a display.

A portion in the panel where the piezoelectric element is joined is preferably positioned outside of a region where the panel and the display overlap.

The electronic device according to the present invention can be appropriately used as a type of electronic device that vibrates a panel attached to a housing.

BRIEF DESCRIPTION OF DRAWINGS

The present invention will be further described below with reference to the accompanying drawings, wherein:

FIG. 2 illustrates an appropriate configuration of a panel;

FIGS. 3A, 3B, 3C, and 3D illustrate a housing structure of the electronic device according to Embodiment 1;

FIGS. 4A, 4B, and 4C illustrate a modification to Embodiment 1;

FIG. 8 illustrates an example of joining the panel and the housing;

FIGS. 18A, 18B, and 18C illustrate a housing structure of the electronic device according to Embodiment 7;

FIGS. 20A, 20B, and 20C illustrate a housing structure of the electronic device according to Embodiment 8.

DESCRIPTION OF EMBODIMENTS

Figure 1:
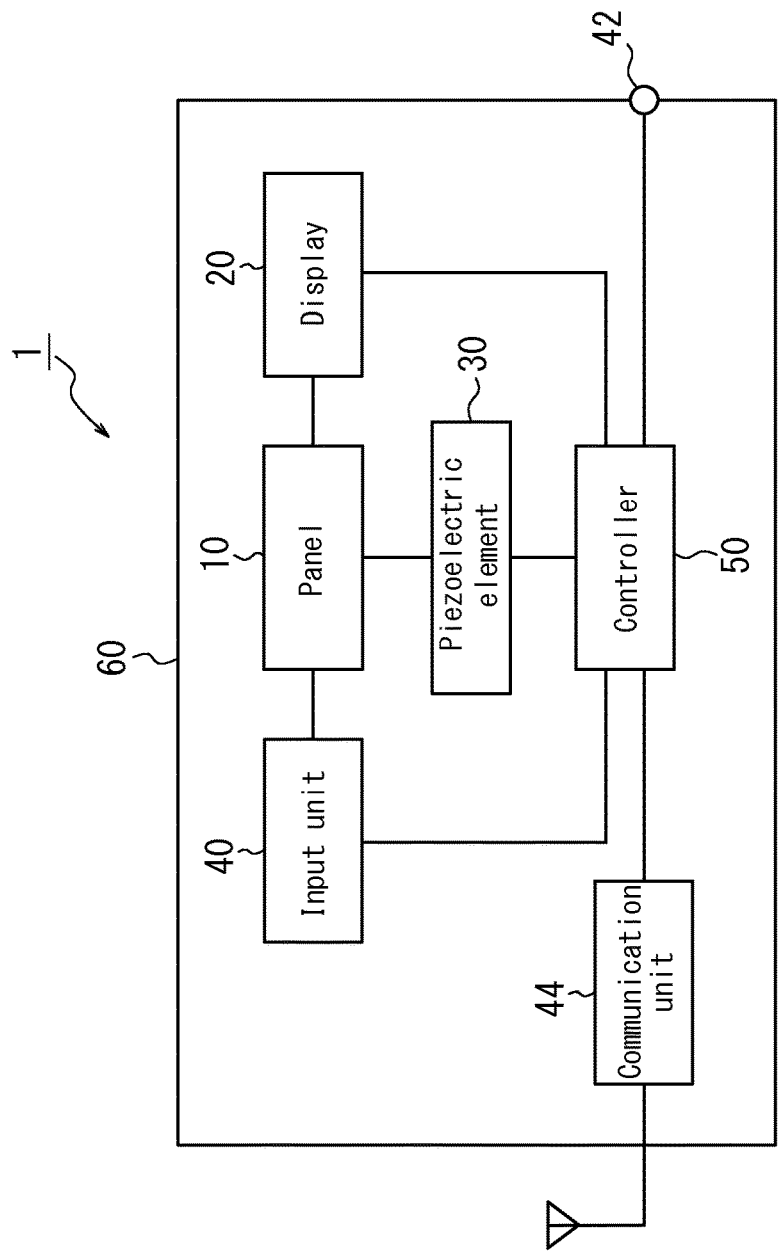
FIG. 1 is a functional block diagram of an electronic device according to an embodiment.

Embodiments of the present invention are described below in detail with reference to the accompanying drawings. FIG. 1 is a functional block diagram of an electronic device 1 according to an embodiment of the present invention. The electronic device 1 is, for example, a mobile phone (smartphone) and includes a panel 10, a display 20, a piezoelectric element 30, an input unit 40, a microphone 42, a communication unit 44, and a controller 50.

The panel 10 is a touch panel that detects contact or is a cover panel or the like that protects the display 20. The panel 10 is, for example, made from glass or a synthetic resin such as acrylic or the like. The panel 10 is preferably plate-like in shape. The panel 10 may be a flat plate or may be a curved panel, the surface of which is smoothly inclined. When the panel 10 is a touch panel, the panel 10 detects contact by the user's finger, a pen, a stylus pen, or the like. Any detection system may be used in the touch panel, such as a capacitive system, a resistive film system, a surface acoustic wave system (or an ultrasonic wave system), an infrared system, an electromagnetic induction system, a load detection system, or the like.

The display 20 is a display device such as a liquid crystal display, an organic EL display, an inorganic EL display, or the like. The display 20 is provided on the back face of the panel 10. The display 20 may be adhered to the panel 10 by a joining member (for example, adhesive) or disposed at a distance from the panel 10 and supported by the housing of the electronic device 1. In a preferred example, the display 20 is joined on the back face of the panel 10 by a joining member (for example, adhesive). For example, the joining member is elasticity resin, such as optical elasticity resin, that controls the index of refraction of transmitted light. The display 20 displays a variety of information through the joining member and the panel 10. By joining the display 20 to the back face of the panel 10, the amount by which vibration of the panel 10 is damped can be adjusted, as described below.

The piezoelectric element 30 is formed by elements that, upon application of an electric signal (voltage), either expand and contract or bend (flex) in accordance with the electromechanical coupling coefficient of their constituent material. Ceramic or crystal elements, for example, may be used. The piezoelectric element 30 may be a unimorph, bimorph, or laminated piezoelectric element. Examples of a laminated piezoelectric element include a laminated unimorph element with layers of unimorph (for example, 16 or 24 layers) and a laminated bimorph element with layers of bimorph (for example, 16 or 24 layers). Such a laminated piezoelectric element may be configured with a laminated structure formed by a plurality of dielectric layers composed of, for example, lead zirconate titanate (PZT) and electrode layers disposed between the dielectric layers. Unimorph expands and contracts upon the application of an electric signal (voltage), and bimorph bends upon the application of an electric signal (voltage).

The piezoelectric element 30 is disposed on the back face of the panel 10 (the face on the inner side of the electronic device 1). The piezoelectric element 30 is attached to the panel 10 by a joining member (for example, double-sided tape). The piezoelectric element 30 may be attached to the panel 10 with an intermediate member (for example, sheet metal) therebetween. Once disposed on the back face of the panel 10, the piezoelectric element 30 is separated from the inner surface of a housing 60 by a predetermined distance. The piezoelectric element 30 is preferably separated from the inner surface of the housing 60 by the predetermined distance even when expanding and contracting or bending. In other words, the distance between the piezoelectric element 30 and the inner face of the housing 60 is preferably larger than the maximum amount of deformation of the piezoelectric element 30.

The input unit 40 accepts operation input from the user and may be configured, for example, using operation buttons (operation keys). Note that when the panel 10 is a touch panel, the panel 10 can also accept operation input from the user by detecting contact by the user.

The controller 50 is a processor that controls the electronic device 1. The controller 50 applies a predetermined electric signal (a voltage corresponding to an audio signal) to the piezoelectric element 30. The voltage that the controller 50 applies to the piezoelectric element 30 may, for example, be ±15 V. This is higher than ±5 V, i.e. the applied voltage of a so-called panel speaker for conduction of sound by air-conducted sound rather than human body vibration sound. In this way, even if the user presses the panel 10 against the user's body with a force of 3 N or greater (for example, a force of 5 N to 10 N), sufficient vibration is generated in the panel 10, so that a human body vibration sound can be generated via a part of the user's body. Note that the magnitude of the applied voltage used may be appropriately adjusted in accordance with the fixation strength of the panel 10 with respect to the housing or a support member, or in accordance with the performance of the piezoelectric element 30.

Upon the controller 50 applying the electric signal to the piezoelectric element 30, the piezoelectric element 30 expands and contracts or bends in the longitudinal direction. At this point, the panel 10 to which the piezoelectric element 30 is attached deforms in conjunction with the expansion and contraction or bending of the piezoelectric element 30. The panel 10 thus vibrates. The panel 10 flexes due to expansion and contraction or to bending of the piezoelectric element 30. The panel 10 is bent directly by the piezoelectric element 30. Stating that "the panel 10 is bent directly by the piezoelectric element" differs from the phenomenon utilized in known panel speakers, whereby the panel deforms upon vibration of a certain region of the panel due to the inertial force of a piezoelectric actuator constituted by a piezoelectric element disposed in the casing. Stating that "the panel 10 is bent directly by the piezoelectric element" refers instead to how expansion and contraction or bending (flexure) of the piezoelectric element directly bends the panel via the joining member or via the joining member and the below-described reinforcing member 80. Therefore, along with generating air-conducted sound, the panel 10 generates human body vibration sound via a part of the user's body when the user brings a part of the body (such as the cartilage of the outer ear) into contact. The controller 50 can apply an electric signal, for example corresponding to an audio signal received by the communication unit 44 and related to the other party's voice, to the piezoelectric element 30 to generate air-conducted sound and human body vibration sound that correspond to the audio signal. The audio signal may be related to ringtones, music including songs, or the like. Note that the audio signal pertaining to the electric signal may be based on music data stored in internal memory of the electronic device 1, or may be music data stored on an external server or the like and played back over a network.

The communication unit 44 converts the audio signal picked up by the microphone 42 into a baseband signal and transmits the baseband signal to the electronic device of the other party. The communication unit 44 also receives a baseband signal by wireless communication from the electronic device of the other party and extracts an audio signal. The extracted audio signal is output by the controller 50 from the panel 10 as air-conducted sound and bone-conducted sound.

The panel 10 vibrates not only in the region in which the piezoelectric element 30 is attached, but also in a region separate from the attachment region. In the region of vibration, the panel 10 includes a plurality of locations at which the panel 10 vibrates in a direction intersecting the surface of the panel 10. At each of these locations, the value of the vibration amplitude changes over time from positive to negative or vice-versa. At a given instant during vibration of the panel 10, portions with a relatively large vibration amplitude and portions with a relatively small vibration amplitude appear to be distributed randomly or cyclically over nearly the entire panel 10. In other words, a plurality of vibration waves are detected across the entire panel 10. The voltage that the controller 50 applies to the piezoelectric element 30 may be ±15 V to prevent damping of the above-described vibration of the panel 10 even if the user presses the panel 10 against the user's body with a force of, for example, 5 N to 10 N. Therefore, the user can hear sound by contacting a region distant from the above-described attachment region of the panel 10 to the ear.

The panel 10 may be nearly the same size as the user's ear. As illustrated in FIG. 2, the panel 10 may also be larger than the user's ear. Adopting such a size makes it easier for the panel 10 of the electronic device 1 to cover the entire ear when the user listens to sound, thus making it difficult for surrounding sounds (noise) to enter the external ear canal. The region of the panel 10 that vibrates should be larger than a region having a length corresponding to the distance from the inferior antihelix crus to the antitragus and a width corresponding to the distance from the tragus to the antihelix. The region of the panel 10 that vibrates preferably has a length corresponding to the distance from a position in the helix near the superior antihelix crus to the earlobe and a width corresponding to the distance from the tragus to a position in the helix near the antihelix. In this context, the direction of length is a longitudinal direction 2a in which the panel 10 extends. Along this direction, the piezoelectric element 30 is disposed toward one end from the center of the panel 10. The direction of width is a direction 2b intersecting the longitudinal direction.

The region with such a length and width may be a rectangular region or may be an elliptical region with the above length as the major axis and the above width as the minor axis. The average size of a Japanese person's ear can be looked up in sources such as the Japanese Body Dimension Data (1992-1994) gathered by the Research Institute of Human Engineering for Quality Life (HQL). Note that if the panel 10 is at least as large as the average size of a Japanese person's ear, it is thought that the panel 10 will be a size capable of covering the entire ear of most non-Japanese people. With the above-described dimensions and shape, the panel 10 can cover the user's ear and has tolerance for misalignment when placed against the ear.

When functioning as a mobile phone, the electronic device 1 can, by vibration of the panel 10, transmit human body vibration sound through a part of the user's body (such as the cartilage of the outer ear) and air-conducted sound to the user. When vibration of the panel 10, generated by the piezoelectric element 30, generates sound transmitted inside the human body, the sound transmitted inside the human body vibrates the middle ear or the inner ear via soft tissue (such as cartilage) of the human body. When sound is output at a volume equivalent to a known dynamic receiver, the sound that is transmitted to the periphery of the electronic device 1 by air vibrations due to vibration of the panel 10 is smaller than with a dynamic receiver. Accordingly, the electronic device 1 is appropriate for listening to recorded messages, for example, on the train or the like.

Furthermore, the electronic device 1 transmits human body vibration sound by vibration of the panel 10, and therefore even if the user is wearing earphones or headphones, for example, the user can hear sound through the earphones or headphones and through a part of the body by contacting the electronic device 1 against the earphones or headphones.

The electronic device 1 transmits sound to a user by vibration of the panel 10. Therefore, if the electronic device 1 is not provided with a separate dynamic receiver, it is unnecessary to form an opening (sound discharge port) for sound transmission in the housing, thereby simplifying waterproof construction of the electronic device 1. On the other hand, if the electronic device 1 is provided with a dynamic receiver, the sound discharge port should be blocked by a member permeable by air but not liquid. Gore-Tex (registered trademark) is an example of a member permeable by air but not liquid.

Embodiment 1

FIGS. 3A to 3D illustrate a housing structure of the electronic device 1 according to Embodiment 1. FIG. 3A is a front view, and FIGS. 3B to 3D are cross-sectional views along the b-b line of FIG. 3A. The electronic device 1 illustrated in FIGS. 3A to 3D is a smartphone in which a touch panel that is a glass plate is disposed on the front face of the housing 60 (for example a metal or resin case) as the panel 10. The front face illustrated in FIG. 3A corresponds to the "first face" of the housing 60, and the back face corresponds to the "second face".

The panel 10 and the input unit 40 are supported by the housing 60, and the display 20 and piezoelectric element 30 are each adhered to the panel 10 by a joining member 70. The joining member 70 is adhesive with thermosetting properties, ultraviolet curable properties, or other such properties; double-sided tape; or the like. The joining member 70 may, for example, be optical elasticity resin, which is clear and colorless acrylic ultraviolet curing adhesive. The panel 10, display 20, and piezoelectric element 30 are each generally rectangular. The controller 50 is mounted on a circuit board 50a provided facing the back face of the panel 10 and the display 20.

The display 20 is disposed in approximately the center in the transverse direction of the panel 10. The piezoelectric element 30 is disposed at a predetermined distance from an edge of the panel 10 in the longitudinal direction, near the edge so that the longitudinal direction of the piezoelectric element 30 is aligned with the short sides of the panel 10. The display 20 and the piezoelectric element 30 are disposed side by side, in parallel directions, on the inner face of the panel 10.

The microphone 42 is disposed at the lower part of the panel 10. The microphone 42 picks up outside audio through a hole (sound transmission hole) 42a, provided on the front face of the housing 60, for picking up sound. The sound transmission hole 42a is provided with waterproofing by a waterproof sheet omitted from the drawings (for example, Gore-Tex (registered trademark)). The microphone 42a is connected and fixed to a circuit board 50b provided at the back face in the housing 60.

In the housing 60, between the panel 10 and the microphone 42, a buffer 31 is provided to damp a vibration B1 transmitted across the front face of the housing 60, and/or a vibration B2 transmitted across the back face, from the panel 10 toward the microphone 42. The buffer 31 includes, for example, either or both of a rib 34 provided within the housing 60 and a vibration absorption member 36 that is provided between and attached to both the circuit board 50b and the back face of the housing 60. Additionally, a sound insulation wall 32 that surrounds the microphone 42 may be provided in the housing 60.

The rib 34 extends in the transverse direction, intersecting the longitudinal direction from the upper part of the housing 60 where the panel 10 is provided to the lower part of the housing 60 where the microphone 42 is provided. As illustrated in FIG. 3B, the rib 34 is provided integrally with or separately from the housing 60 at either the inner side of the front face or the inner side of the back face of the housing 60 and has a height such that the rib 34 abuts the other face. The rib 34 is, for example, formed from the same resin, metal, or other material as the housing 60. The length in the direction in which the rib 34 extends, i.e. the transverse direction of the housing 60, is preferably equivalent to the length of the housing 60 in the transverse direction. The rib 34 can thus separate the upper part 60a and the lower part 60b of the housing 60 into separate chambers, yielding a two-chamber structure. In this way, when the panel 10 vibrates due to the piezoelectric element 30, the vibrations B1 and B2 transmitted from the upper part 60a to the lower part 60b across the front face and/or the back face of the housing 60 can be damped. Hence, at the lower part 60b, the sound occurring due to vibration of the board or other components near the microphone 42 in the housing 60 can be suppressed. Accordingly, noise that mixes in with speech can be reduced. It is also possible to suppress an echo whereby speech produced by vibration of the panel 10 is picked up by the microphone 42 and sent back to the other party.

Note that the case of the height of the rib 34 not reaching from the inner side of the front face to the inner side of the back face of the housing 60 is also included in the scope of the present invention. For example, as illustrated in FIG. 3C, by providing the rib 34 at the inner side of the front face of the housing 60, the rib 34 can increase the rigidity of that portion and can damp the vibration B1 transmitted from the upper part 60a to the lower part 60b across the front face of the housing 60. Furthermore, as illustrated in FIG. 3D, by providing the rib 34 at the inner side of the back face of the housing 60, the rib 34 can increase the rigidity of that area and can damp the vibration B2 transmitted from the upper part 60a to the lower part 60b across the back face of the housing 60.

The vibration absorption member 36 is fixed to the circuit board 50b and to the inner side of the back face of the housing 60 by being adhered with adhesive, double-sided tape, or the like. The vibration absorption member 36 is foam material such as sponge or the like. By providing the vibration absorption member 36, the vibration B2 transmitted from the back face of the housing 60 can be absorbed at the board 50b where the microphone 42 is provided, thereby reducing sound generated by vibration of the board 50b. Accordingly, noise picked up by the microphone 42 can be reduced.

The sound insulation wall 32 that surrounds the microphone 42 is, for example, made of rubber. The sound insulation wall 32 is preferably provided so as to surround the entire periphery of the microphone 42. The sound insulation wall 32 may, however, be separated at one or more locations. In this example, the sound insulation wall 32 is illustrated as being circular in plan view, yet the shape is not limited to being circular. Furthermore, the sound insulation wall 32 is preferably high enough for the upper part thereof to abut the inner side of the front face of the housing 60. The case of the sound insulation wall 32 not being this high, however, is also included in the scope of the present invention. By providing the sound insulation wall 32, propagation of sound within the interior space of the housing 60 can be blocked off even if sound is generated by the housing 60, or any of a variety of circuit components contained therein, vibrating due to vibration of the panel 10. Accordingly, noise or echoes picked up by the microphone 42 can be reduced.

FIGS. 4A to 4C illustrate a modification to the buffer 31. FIGS. 4A and 4B illustrate a modification to the rib 34 in plan view. The length in the direction in which the rib 34 extends, i.e. in the transverse direction of the housing 60, was illustrated in FIG. 3A as being equivalent to the length of the housing 60 in the transverse direction. Alternatively, for example as illustrated in FIG. 4A, the rib 34 may be bent to have a portion extending in the longitudinal direction of the housing 60, or as illustrated in FIG. 4B, the rib 34 may be provided intermittently. Furthermore, as illustrated in FIG. 4A, for example by having the rib 34 surround the microphone 42, the microphone 42 can be isolated from other portions of the housing 60, and vibration transmitted to the microphone 42 can be damped.

FIG. 4C illustrates a modification to the rib 34 along the b-b cross-section. The rib 34 may be bent in the direction of height thereof. In this way, the degree of freedom for disposing circuit components and the like within the housing 60 can be increased.

Figure 5:
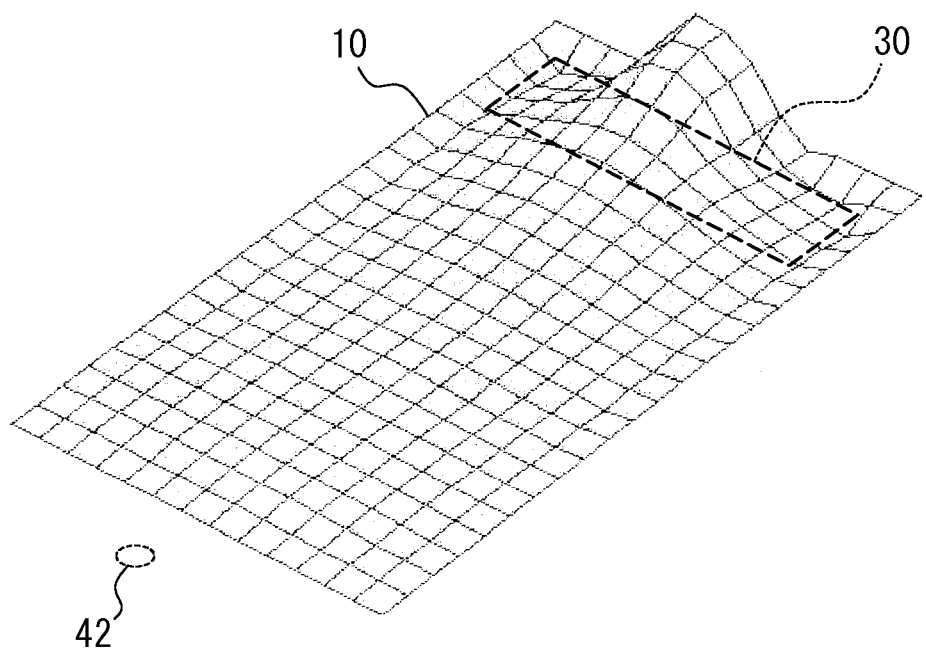
FIG. 5 illustrates an example of vibration of a panel in the electronic device according to Embodiment 1.

FIG. 5 illustrates an example of vibration of the panel 10 in the electronic device 1 according to Embodiment 1. In the electronic device 1 according to Embodiment 1, the piezoelectric element 30 is provided at the upper part of the panel 10, and the display 20 is attached to the panel 10. The upper part of the panel 10 is bent directly by the piezoelectric element 30, and hence compared to the upper part, vibration is damped at the lower part. The panel 10 is bent by the piezoelectric element 30 in the direction of the long sides of the piezoelectric element 30 such that the portion of the panel 10 immediately above the piezoelectric element 30 rises the highest as compared to adjacent portions. Therefore, it is more difficult for the lower part of the panel 10 to vibrate as compared to the upper part of the panel 10 where the piezoelectric element 30 is attached. As a result, at the lower part of the panel 10, sound leakage due to vibration of the lower part of the panel 10 is reduced. Furthermore, vibration in the panel 10 can be sufficiently damped near the microphone 42. As a result, noise or echoes picked up by the microphone 42 can be reduced.

In the electronic device 1 according to the present embodiment, the panel 10 thus deforms in conjunction with deformation of the piezoelectric element 30 attached to the back face of the panel 10, so that air-conducted sound and human body vibration sound are transmitted to an object that contacts the deforming panel 10. As a result, air-conducted sound and human body vibration sound can be transmitted to the user without projecting the vibrating body from the outer surface of the housing 60, thereby improving usability over the electronic device disclosed in Patent Literature 1, in which a vibrating body extremely small as compared to the housing is pressed against a human body. The piezoelectric element 30 also does not damage easily, since the user's ear need not be pressed against the piezoelectric element itself. Moreover, causing the housing 60 rather than the panel 10 to deform makes it easier for the user to drop the terminal when vibration is generated, whereas vibrating the panel 10 makes such dropping of the terminal unlikely.

The piezoelectric element 30 is joined to the panel 10 by the joining member 70. The piezoelectric element 30 can thus be attached to the panel 10 in a way that avoids restricting the degree of freedom for deformation of the piezoelectric element 30. The joining member 70 may be a non-heat hardening adhesive. Such adhesive has the advantage that, during hardening, thermal stress contraction does not easily occur between the piezoelectric element 30 and the panel 10. The joining member 70 may also be double-sided tape. Such tape has the advantage that the contraction stress when using adhesive is not easily produced between the piezoelectric element 30 and the panel 10.

Embodiment 2

Figure 6A:
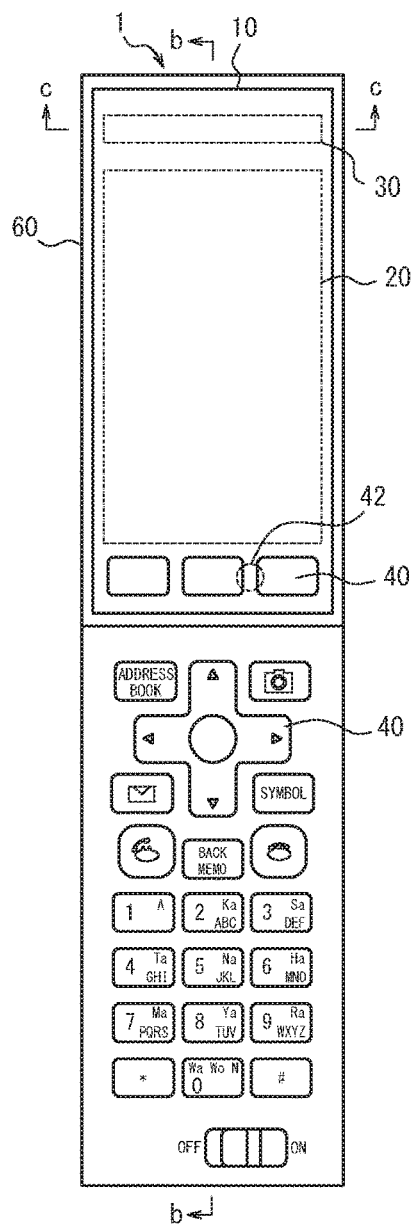
FIGS. 6A, 6B, and 6C illustrate a housing structure of the electronic device according to Embodiment 2.
Figure 6B:
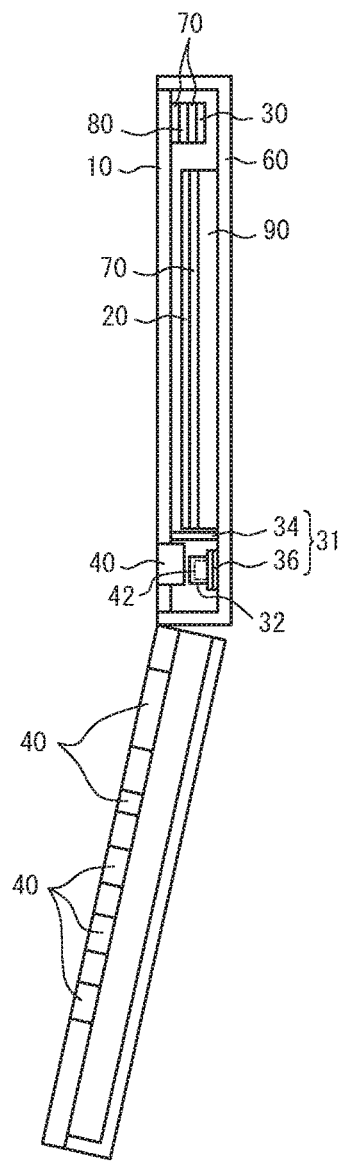
Figure 6C:
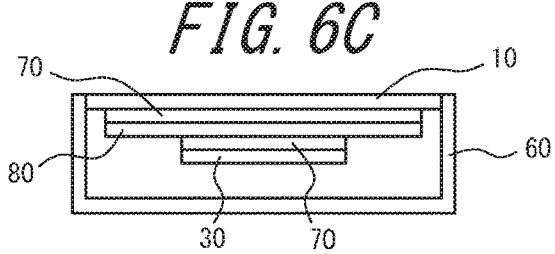

FIGS. 6A to 6C illustrate a housing structure of the electronic device 1 according to Embodiment 2. FIG. 6A is a front view, FIG. 6B is a cross-sectional view along the b-b line of FIG. 6A, and FIG. 6C is a cross-sectional view along the c-c line of FIG. 6A. The electronic device 1 illustrated in FIGS. 6A to 6C is a clamshell mobile phone in which a cover panel (an acrylic plate) protecting the display 20 is disposed on the front face at the upper side of the housing 60 as the panel 10. In Embodiment 2, a reinforcing member 80 is disposed between the panel 10 and the piezoelectric element 30. The reinforcing member 80 is, for example, a resin plate, sheet metal, or a resin plate including glass fiber. In other words, in the electronic device 1 according to Embodiment 2, the piezoelectric element 30 and the reinforcing member 80 are adhered by the joining member 70, and furthermore the reinforcing member 80 and the panel 10 are adhered by the joining member 70. Furthermore, in Embodiment 2, the display 20 is not adhered to the panel 10, but rather is supported by the housing 60. In other words, in the electronic device 1 according to Embodiment 2, the display 20 is separated from the panel 10 and is joined to a support 90, which is a portion of the housing 60, by the joining member 70. The support 90 is not limited to being a portion of the housing 60 and may be configured using metal, resin, or the like to be a member independent from the housing 60.

In the structure illustrated in FIGS. 6A through 6C, even when the microphone 42 is provided in the housing 60, either or both of the buffer 31 (which includes the rib 34 and the vibration absorption member 36) and the sound insulation wall 32 can be provided, as in Embodiment 1. In this way, noise or echoes picked up by the microphone 42 can be reduced.

Figure 7:
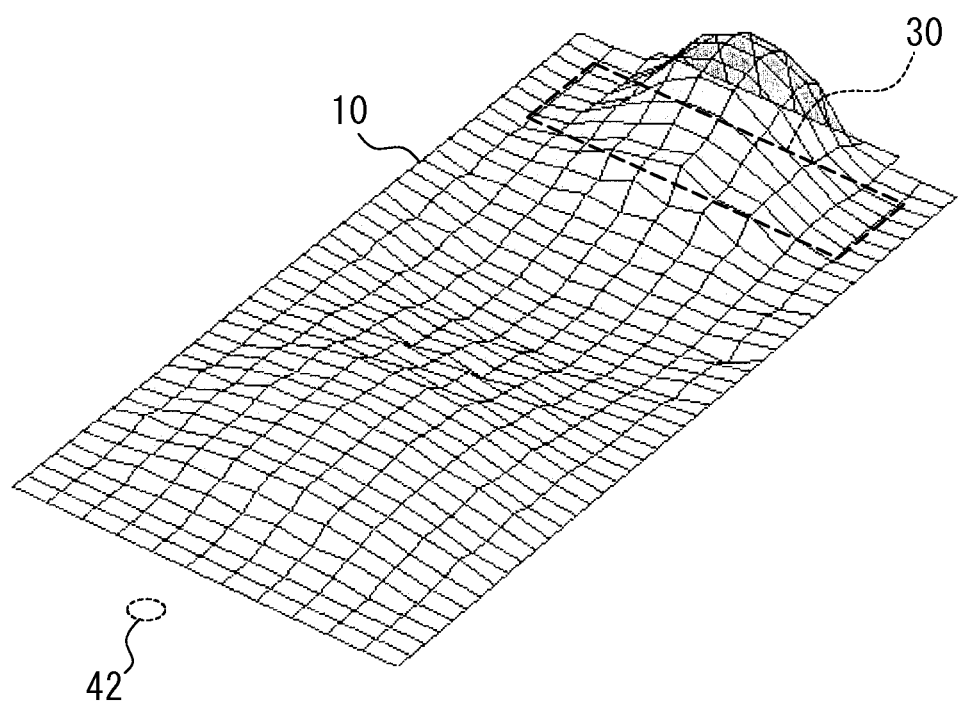
FIG. 7 illustrates an example of vibration of a panel in the electronic device according to Embodiment 2.

FIG. 7 illustrates an example of vibration of the panel 10 in the electronic device 1 according to Embodiment 2. In the electronic device 1 according to Embodiment 2, the panel 10 is an acrylic plate with lower rigidity than a glass plate, and the display 20 is not adhered to the back face of the panel 10. Therefore, as compared to the electronic device 1 according to Embodiment 1 illustrated in FIGS. 4A to 4C, the amplitude produced by the piezoelectric element 30 is greater. Moreover, the panel 10 vibrates not only in the region in which the piezoelectric element 30 is attached, but also in a region separate from the attachment region. Therefore, in addition to air-conducted sound, the user can hear human body vibration sound by contacting the ear to any position on the panel 10. In this case as well, by providing the buffer 31, which includes the rib 34 and/or the vibration absorption member 36, and the sound insulation wall 32 around the microphone 42, noise or echoes picked up by the microphone 42 can be reduced.

In the electronic device 1 according to the present embodiment, the reinforcing member 80 and the panel 10 deform in conjunction with deformation of the piezoelectric element 30 attached to the panel 10 via the reinforcing member 80, so that air-conducted sound and human body vibration sound are transmitted to an object that contacts the deforming panel 10. As a result, air-conducted sound and human body vibration sound can be transmitted to the user without the user's ear being pressed against the vibrating body itself. Furthermore, the piezoelectric element 30 is attached to the surface of the panel 10 that faces the inside of the housing 60. Air-conducted sound and human body vibration sound can thus be transmitted to the user without projecting the vibrating body from the outer surface of the housing 60. Moreover, the panel 10 deforms not only in the region in which the piezoelectric element 30 is attached, but rather throughout the panel 10 in order to transmit air-conducted sound and human body vibration sound. Therefore, in addition to air-conducted sound, the user can hear human body vibration sound by contacting the ear to any position on the panel 10.

Disposing the reinforcing member 80 between the piezoelectric element 30 and the panel 10 can reduce the probability of an external force being transmitted to and damaging the piezoelectric element 30 if, for example, such a force is applied to the panel 10. Moreover, even if the panel 10 is pressed firmly against a human body, vibration of the panel 10 does not dampen easily. By disposing the reinforcing member 80 between the piezoelectric element 30 and the panel 10, the resonance frequency of the panel 10 also decreases, thereby improving the acoustic characteristics in the low frequency band. Note that instead of the reinforcing member 80, a plate-shaped anchor may be attached to the piezoelectric element 30 by the joining member 70.

Although Embodiments 1 and 2 have been described based on drawings and examples, it is to be noted that various changes and modifications will be apparent to those skilled in the art based on the present disclosure. Therefore, such changes and modifications are to be understood as included within the scope of the present invention. Note that the same holds for the other embodiments described below as well. For example, the functions and the like included in the various members and steps may be reordered in any logically consistent way. Furthermore, components or steps may be combined into one or divided.

For example, as illustrated in FIG. 8, the panel 10 may be joined to the housing 60 by the joining member 70. Making it difficult for vibration to be transmitted directly from the panel 10 to the housing 60 in this way reduces the risk of the user dropping the electronic device 1 as compared to when the housing itself vibrates significantly. The joining member 70 may be a non-heat hardening adhesive. Such adhesive has the advantage that, during hardening, thermal stress contraction does not easily occur between the housing 60 and the panel 10. The joining member 70 may also be double-sided tape. Such tape has the advantage that the contraction stress when using adhesive is not easily produced between the housing 60 and the panel 10.

For example, when the panel 10 and the display 20 do not overlap, the piezoelectric element 30 may be disposed at the center of the panel 10. When the piezoelectric element 30 is disposed at the center of the panel 10, vibration of the piezoelectric element 30 is transmitted uniformly across the entire panel 10, thereby improving quality of air-conducted sound and permitting recognition of human body vibration sound when the user contacts the ear to any of various positions on the panel 10. As in the above-described embodiment, a plurality of piezoelectric elements 30 may also be provided.

The piezoelectric element 30 is attached to the panel 10 in the above electronic device 1 but instead may be attached to a location other than the panel 10. For example, the piezoelectric element 30 may be attached to a battery lid that is attached to the housing 60 and covers a battery. Since the battery lid is often attached to a different face than the panel 10 in the electronic device 1 that is a mobile phone or the like, according to this structure the user can hear sound by contacting a part of the body (such as the ear) to a different face than the panel 10.

Furthermore, the panel 10 may constitute a portion or the entirety of any of a display panel, an operation panel, a cover panel, or a lid panel that allows for removal of a rechargeable battery. When the panel 10 is a display panel, the piezoelectric element 30 may be disposed on the outside of a display region fulfilling a display function. This offers the advantage of not blocking the display. The operation panel includes the touch panel of Embodiment 1. The operation panel also includes a sheet key, in which the tops of operation keys are integrally formed in, for example, a clamshell mobile phone so as to constitute one face of the housing alongside an operation unit.

Note that in Embodiments 1 and 2, the joining member that adheres the panel 10 and the piezoelectric element 30, the joining member that adheres the panel 10 and the housing 60, and the like have been described as the joining member 70, using the same reference numeral. The joining members used in Embodiments 1 and 2, however, may differ as needed in accordance with the components being joined.

Embodiment 3

Figure 9A:
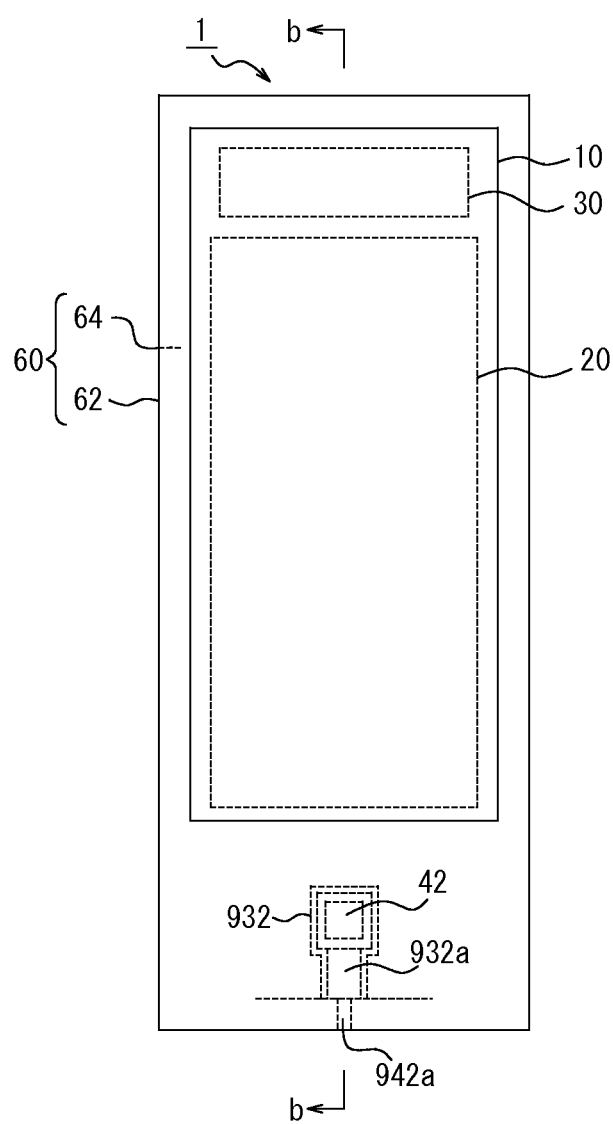
FIGS. 9A and 9B illustrate a housing structure of the electronic device according to Embodiment 3.
Figure 9B:
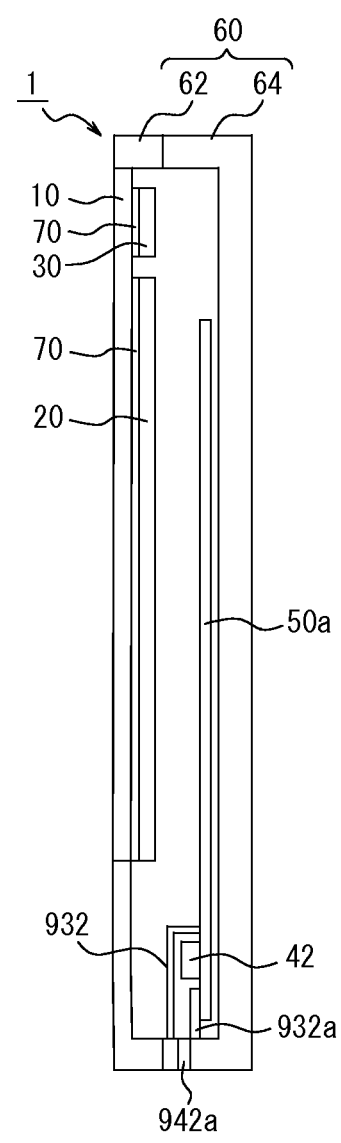

FIGS. 9A and 9B illustrate a housing structure of the electronic device 1 according to Embodiment 3. FIG. 9A is a front view (of the front face), and FIG. 9B is a cross-sectional view along the b-b line of FIG. 9A. The electronic device 1 illustrated in FIGS. 9A and 9B is a smartphone in which a touch panel that is a glass plate is disposed on the front face of the housing 60 (for example a metal or resin case) as the panel 10. The panel 10 and the input unit 40 are supported by the housing 60, and the display 20 and piezoelectric element 30 are each adhered to the panel 10 by a joining member 70. The joining member 70 is adhesive with thermosetting properties, ultraviolet curable properties, or other such properties; double-sided tape; or the like. The joining member 70 may, for example, be optical elasticity resin, which is clear and colorless acrylic ultraviolet curing adhesive. The panel 10, display 20, and piezoelectric element 30 are each generally rectangular. The controller 50 is mounted on a circuit board 50a provided facing the back face of the panel 10 and the display 20. Note that in FIGS. 9A and 9B, the communication unit 44 is not illustrated.

The display 20 is disposed in approximately the center in the transverse direction of the panel 10. The piezoelectric element 30 is disposed at a predetermined distance from an edge of the panel 10 in the longitudinal direction, near the edge so that the longitudinal direction of the piezoelectric element 30 is aligned with the short sides of the panel 10. The display 20 and the piezoelectric element 30 are disposed side by side, in parallel directions, on the inner face of the panel 10.

The microphone 42 is mounted on the circuit board 50a within the housing 60. The microphone 42 is surrounded and covered by a sound insulation wall 932. The sound insulation wall 932 is, for example, made of rubber and forms a duct 932a communicating with a sound transmission hole 942a. The sound transmission hole 942a is provided on the bottom face of the housing 60, i.e. on a face intersecting the front face where the panel 10 is provided. The sound transmission hole 942a is provided with waterproofing by a waterproof sheet omitted from the drawings (for example, Gore-Tex (registered trademark)). The microphone 42 picks up outside sound through the sound transmission hole 942a and the duct 932a. The microphone 42 and the duct 932a form the "sound collector" in the present embodiment.

By disposing the microphone 42 within the duct 932a, air-conducted sound transmitted within the housing 60 from the panel 10 when the panel 10 vibrates due to the piezoelectric element 30 is blocked by the sound insulation wall 932, making it more difficult for such air-conducted sound to reach the microphone 42. Furthermore, by disposing the sound transmission hole 942a with which the duct 932a communicates on the bottom face of the housing 60, the vibration transmitted across the housing 60 from the panel 10 to the periphery of the sound transmission hole 942a is damped more than when, for example, the sound transmission hole 942a is provided on the front face of the housing 60. Accordingly, abnormal noise generated by vibration of the housing 60 as well as the leakage of speech can be suppressed. Noise or echoes of speech picked up by the microphone 42 can also be reduced.

In a preferred embodiment, the housing 60 is formed by a combination of a first member 62 to which the panel 10 is attached and a second member 64 that is the other portion of the housing 60. For example, in FIGS. 9A and 9B, an upper case that includes the front face is an example of the first member 62, and a rear case that includes the back face is an example of the second member 64. In this structure, the sound transmission hole 942a of the sound collector is disposed on the second member 64, i.e. on the side of the rear case. By adopting this structure, vibration of the panel 10 transmitted from the first member 62 to the discontinuous second member 64 is reduced as compared to when vibration is transmitted across one continuous member. Accordingly, vibration of the housing near the sound transmission hole 942a can be suppressed, and noise or echoes of speech picked up by the microphone 42 can be reduced.

Figure 10:
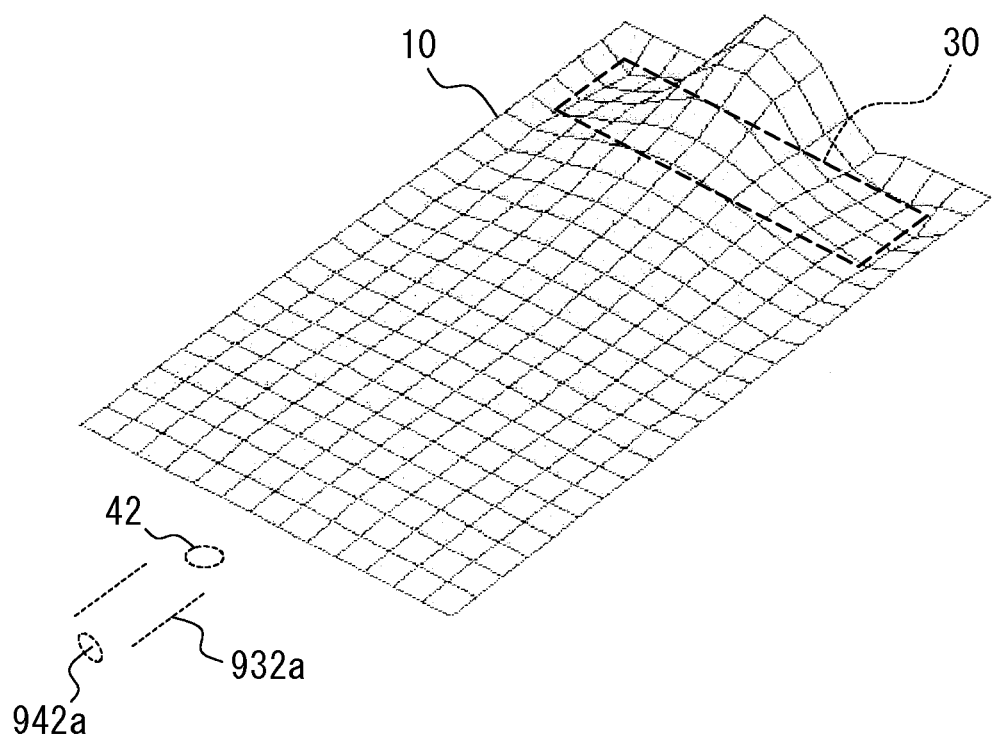
FIG. 10 illustrates an example of vibration of a panel in the electronic device according to Embodiment 3.

FIG. 10 illustrates an example of vibration of the panel 10 in the electronic device 1 according to Embodiment 3. In the electronic device 1 according to Embodiment 3, the piezoelectric element 30 is provided at the upper part of the panel 10, and the display 20 is attached to the panel 10. Therefore, it is more difficult for the lower part of the panel 10 to vibrate as compared to the upper part of the panel 10 where the piezoelectric element 30 is attached. As a result, at the lower part of the panel 10, sound leakage due to vibration of the lower part of the panel 10 is reduced. Furthermore, by providing the sound collector that includes the duct 932a and the microphone 42 at the lower part of the panel 10, vibration in the panel 10 can be damped as the vibration approaches the location of the microphone 42 and the sound transmission hole 942a beyond the microphone 42. As a result, noise or echoes picked up by the microphone 42 can be reduced.

In the electronic device 1 according to the present embodiment, the panel 10 thus deforms in conjunction with deformation of the piezoelectric element 30 attached to the back face of the panel 10, so that air-conducted sound and vibration sound are transmitted to an object that contacts the deforming panel 10. As a result, air-conducted sound and vibration sound can be transmitted to the user without projecting the vibrating body from the outer surface of the housing 60, thereby improving usability over the electronic device disclosed in Patent Literature 1, in which a vibrating body extremely small as compared to the housing is pressed against a human body. The piezoelectric element 30 also does not damage easily, since the user's ear need not be pressed against the piezoelectric element itself. Moreover, causing the housing 60 rather than the panel 10 to deform makes it easier for the user to drop the terminal when vibration is generated, whereas vibrating the panel 10 makes such dropping of the terminal unlikely.

The piezoelectric element 30 is joined to the panel 10 by the joining member 70. The piezoelectric element 30 can thus be attached to the panel 10 in a way that avoids restricting the degree of freedom for deformation of the piezoelectric element 30. The joining member 70 may be a non-heat hardening adhesive. Such adhesive has the advantage that, during hardening, thermal stress contraction does not easily occur between the piezoelectric element 30 and the panel 10. The joining member 70 may also be double-sided tape. Such tape has the advantage that the contraction stress when using adhesive is not easily produced between the piezoelectric element 30 and the panel 10.

Embodiment 4

Figure 11A:
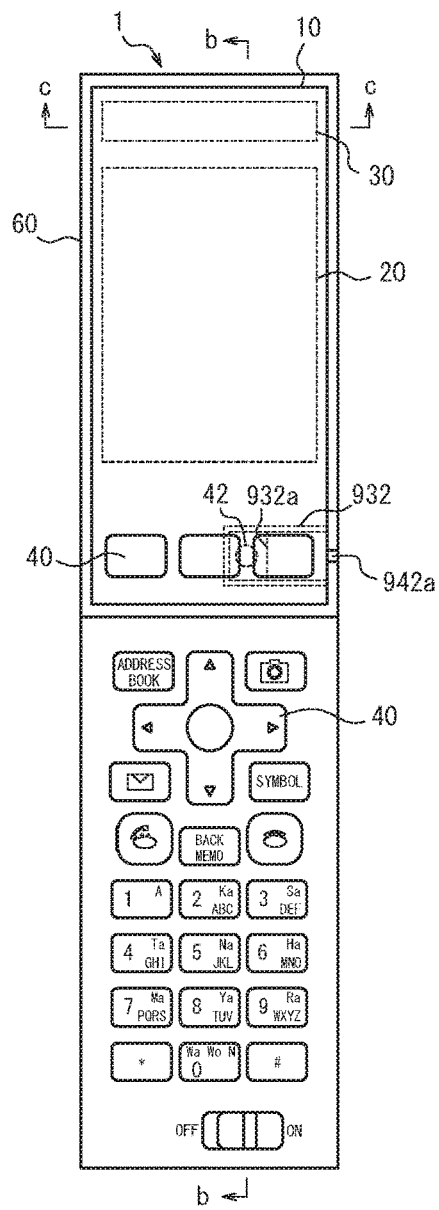
FIGS. 11A, 11B, and 11C illustrate a housing structure of the electronic device according to Embodiment 4.
Figure 11B:
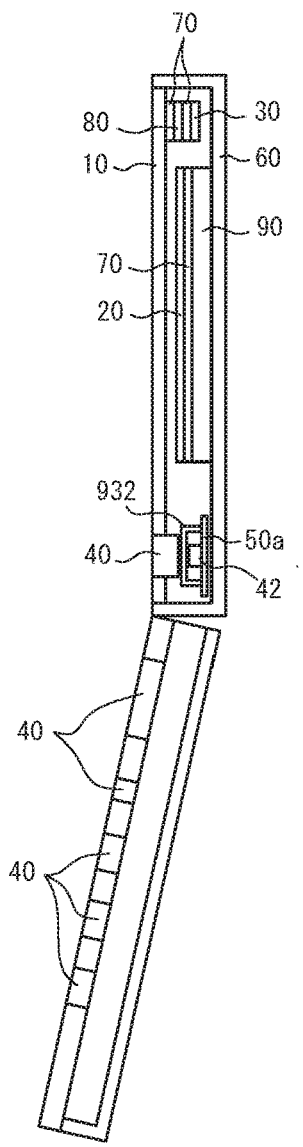
Figure 11C:
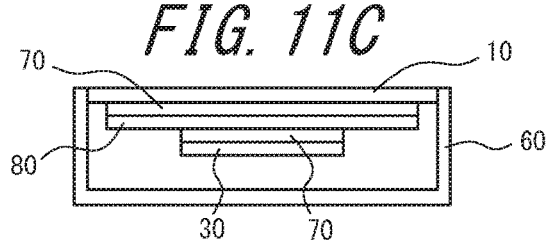

FIGS. 11A to 11C illustrate a housing structure of the electronic device 1 according to Embodiment 4. FIG. 11A is a front view (of the front face), FIG. 11B is a cross-sectional view along the b-b line of FIG. 11A, and FIG. 11C is a cross-sectional view along the c-c line of FIG. 11A. The electronic device 1 illustrated in FIGS. 11A to 11C is a clamshell mobile phone in which a cover panel (for example an acrylic plate) protecting the display 20 is disposed on the front face at the upper side of the housing 60 as the panel 10. In Embodiment 4, a reinforcing member 80 is disposed between the panel 10 and the piezoelectric element 30. The reinforcing member 80 is, for example, a resin plate, sheet metal, or a resin plate including glass fiber. In other words, in the electronic device 1 according to Embodiment 4, the piezoelectric element 30 and the reinforcing member 80 are adhered by the joining member 70, and furthermore the reinforcing member 80 and the panel 10 are adhered by the joining member 70. Furthermore, in Embodiment 4, the display 20 is not adhered to the panel 10, but rather is supported by the housing 60. In other words, in the electronic device 1 according to Embodiment 4, the display 20 is separated from the panel 10 and is joined to a support 90, which is a portion of the housing 60, by the joining member 70. The support 90 is not limited to being a portion of the housing 60 and may be configured using metal, resin, or the like to be a member independent from the housing 60.

In Embodiment 4, the microphone 42 is provided at the back face of operation buttons in the input unit 40. In this example, the sound transmission hole 942a is provided for example on the side face of the housing 60, and the duct 932a in communication with the sound transmission hole 942a is formed by the sound insulation wall 932 that covers the microphone 42. According to this structure, when the panel 10 vibrates due to the piezoelectric element 30, the vibration damps towards the lower part of the panel 10. Therefore, abnormal noise generated by vibration of the housing 60 resulting from vibration of the panel 10 can be suppressed, as can leakage of speech. Noise or echoes of speech picked up by the microphone 42 in the duct 932a via the sound transmission hole 942a can also be reduced.

Figure 12:
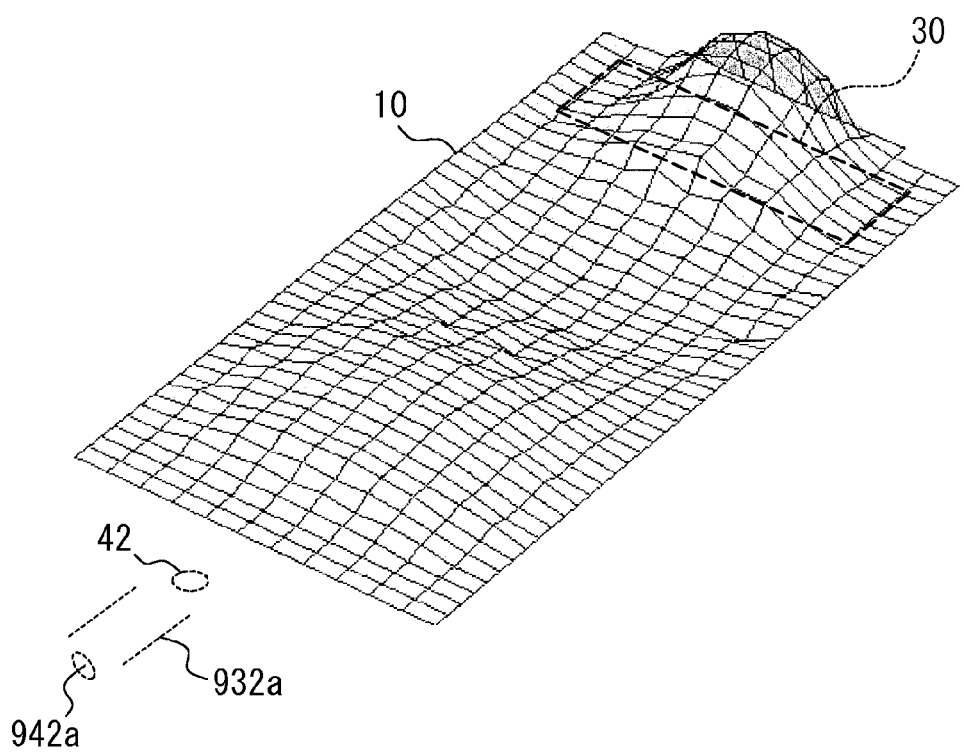
FIG. 12 illustrates an example of vibration of a panel in the electronic device according to Embodiment 4.

FIG. 12 illustrates an example of vibration of the panel 10 in the electronic device 1 according to Embodiment 4. In the electronic device 1 according to Embodiment 4, the panel 10 is an acrylic plate with lower rigidity than a glass plate, and the display 20 is not adhered to the back face of the panel 10. Therefore, as compared to the electronic device 1 according to Embodiment 3 illustrated in FIG. 10, the amplitude produced by the piezoelectric element 30 is greater. Moreover, the panel 10 vibrates not only in the region in which the piezoelectric element 30 is attached, but also in a region separate from the attachment region. Therefore, in addition to air-conducted sound, the user can hear vibration sound by contacting the ear to any position on the panel 10.

In Embodiments 3 and 4, in the case when the panel is disposed on the front face of the housing, the sound transmission hole has been illustrated as being provided on the bottom face or side face of the housing. The position of the sound transmission hole is not limited in this way, however, and may for example be on the back face of the housing. Furthermore, examples of a rectangular housing have been illustrated, yet the housing may be a shape other than rectangular, such as a flattened ellipse or the like. In the examples illustrated above, the sound transmission hole is provided on a flat surface (bottom face or side face of the housing) intersecting a flat surface (front face of the housing) on which the panel is provided. The angle between these flat surfaces, however, is not limited to being a right angle, nor is intersection limited to being along a straight line. In other words, when the housing has a curved surface, Embodiments 3 and 4 also include the case of providing the sound transmission hole on a flat surface that intersects a flat surface, or a tangential plane to a curved surface, on which the panel is provided, as well as the case of providing the sound transmission hole on a curved surface having a tangential plane that intersects a flat surface, or a tangential plane to a curved surface, on which the panel is provided.

Embodiment 5

Figure 13A:
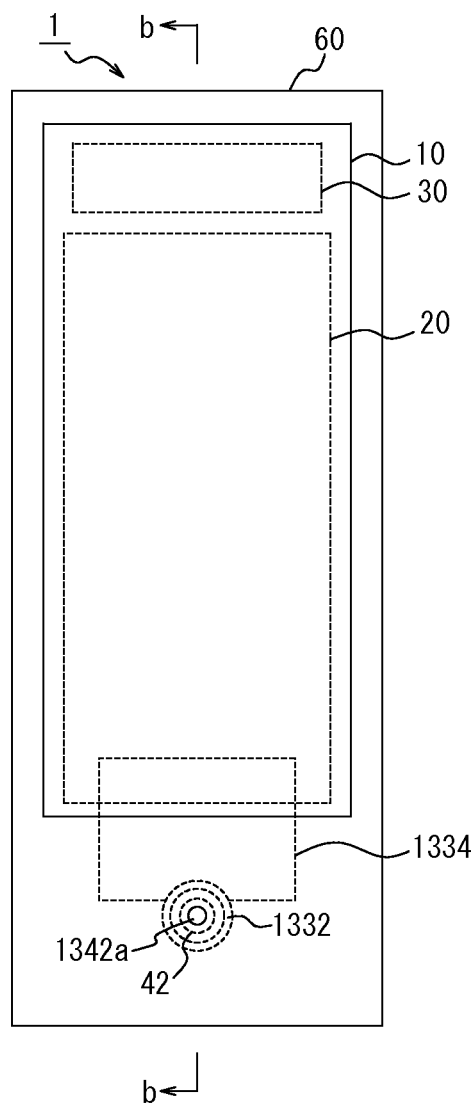
FIGS. 13A, 13B, and 13C illustrate a housing structure of the electronic device according to Embodiment 5.
Figure 13B:
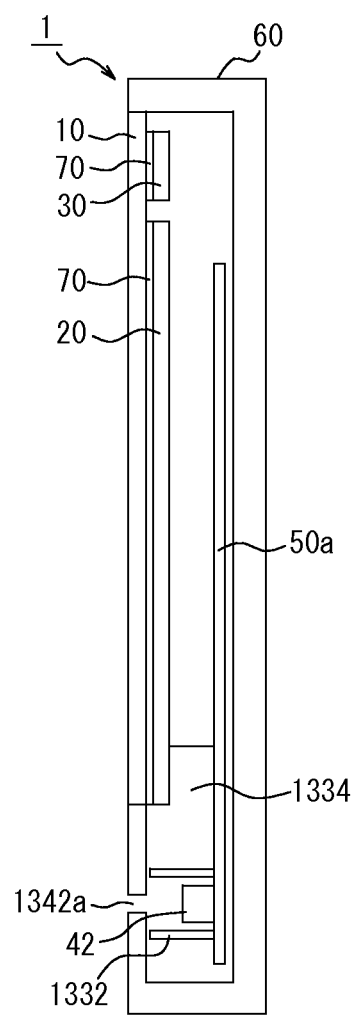
Figure 13C:
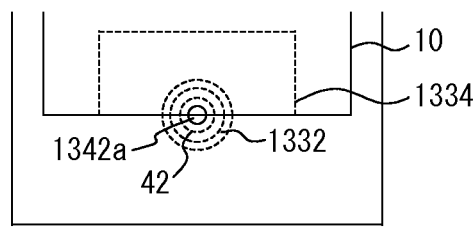

FIGS. 13A to 13C illustrate a housing structure of the electronic device 1 according to Embodiment 5. FIG. 13A is a front view, and FIG. 13B is a cross-sectional view along the b-b line of FIG. 13A. The electronic device 1 illustrated in FIGS. 13A and 13B is a smartphone in which a touch panel that is a glass plate is disposed on the front face of the housing 60 (for example a metal or resin case) as the panel 10. The panel 10 and the input unit 40 are supported by the housing 60, and the display 20 and piezoelectric element 30 are each adhered to the panel 10 by a joining member 70. The joining member 70 is adhesive with thermosetting properties, ultraviolet curable properties, or other such properties; double-sided tape; or the like. The joining member 70 may, for example, be optical elasticity resin, which is clear and colorless acrylic ultraviolet curing adhesive. The panel 10, display unit 20, and piezoelectric element 30 are each generally rectangular. The controller 50 is mounted on a circuit board 50a provided facing the back face of the panel 10 and the display 20.

The display 20 is disposed in approximately the center in the transverse direction of the panel 10. The piezoelectric element 30 is disposed at a predetermined distance from an edge of the panel 10 in the longitudinal direction, near the edge so that the longitudinal direction of the piezoelectric element 30 is aligned with the short sides of the panel 10. The display 20 and the piezoelectric element 30 are disposed side by side, in parallel directions, on the inner face of the panel 10.

The microphone 42 is disposed near the lower edge of the panel 10. Hereinafter, the upper and lower directions as referred to with respect to the electronic device 1, housing 60, and panel 10 correspond to the upper and lower directions of these components in the drawings. In this example, the microphone 42 is illustrated as being disposed in approximately the center in the transverse direction of the panel 10, yet the microphone 42 may be positioned off-center, towards the left or the right. Furthermore, the microphone 42 may be disposed at a distance from the lower edge of the panel 10, as illustrated in FIG. 13A, or in overlap with the lower edge of the panel 10, as illustrated in FIG. 13C. The microphone 42 picks up outside audio through a hole (sound transmission hole) 1342a, provided on the front face of the housing 60, for picking up sound. The sound transmission hole 1342a is provided with waterproofing by a waterproof sheet omitted from the drawings (for example, Gore-Tex (registered trademark)). The microphone 42 is mounted on the circuit board 50a provided on the back face within the housing 60. The microphone 42 is electrically connected to an electrode corresponding to the circuit board 50a and is fixed by adhesive or the like.

A sound insulation wall 1332 surrounds the microphone 42. The sound insulation wall 1332 is made of rubber, for example foam rubber or the like. The sound insulation wall 1332 is preferably provided so as to surround the entire periphery of the microphone 42. The sound insulation wall 1332 may, however, be separated at one or more locations. In this example, the sound insulation wall 1332 is illustrated as being circular in plan view, yet the shape is not limited to being circular. Furthermore, the sound insulation wall 1332 is preferably high enough for the upper part thereof to abut the inner wall of the front face of the housing 60. The case of the sound insulation wall 1332 not being this high, however, is also included in the scope of the present invention. By providing the sound insulation wall 1332, propagation of sound within the interior space of the housing 60 can be blocked off even if sound is generated by the housing 60, or any of a variety of circuit components contained therein, vibrating due to vibration of the panel 10. Accordingly, noise or echoes picked up by the microphone 42 can be reduced.

A buffer member 1334 is disposed within the housing 60, on the board 50a near the lower edge of the panel 10. The buffer member 1334 is adhered and fixed to the board 50a. To adhere the buffer member 1334, for example a well-known adhesive, double-sided tape, or the like may be used. The buffer member 1334 is, for example, made of foam rubber. By its elastic force, the buffer member 1334 biases the lower edge of the panel 10 towards the front face. In this way, when the panel 10 vibrates due to the piezoelectric element 30, the buffer member 1334 can damp vibration especially at the lower edge of the panel 10 more than at the upper edge where the piezoelectric element 30 is fixed. The buffer member 1334 is preferably not adhered to the lower edge of the panel 10, thereby preventing an excessive obstruction of vibration by the panel 10 for output of air-conducted sound and vibration sound. This structure also saves on material required for adhesion and reduces the workload.

FIG. 13A illustrates the rectangular buffer member 1334 in contact with the sound insulation wall 1332, surrounding the upper half of the sound insulation wall 1332. By the buffer member 1334 contacting the sound insulation wall 1332, and preferably being adhered to the sound insulation wall 1332, the space in the housing between the panel 10 and the sound insulation wall 1332 is filled by the buffer member 1334. To adhere the buffer member 1334, for example a well-known adhesive, double-sided tape, or the like may be used. In this way, as compared to when this structure is not adopted, air-conducted sound generated by vibration of the lower edge of the panel 10 can be absorbed, and vibration can be damped so as to suppress vibration sound. However, the scope of the present invention also includes the case of the contact area between the buffer member 1334 and the sound insulation wall 1332 being smaller, for example when the buffer member 1334 only contacts the upper part of the sound insulation wall 1332, and the case of the buffer member 1334 not contacting the sound insulation wall 1332.

In FIG. 13A, the length of the buffer member 1334 in the transverse direction of the panel 10 is illustrated as occupying a portion of the length of the panel 10 in the transverse direction. The shape and dimensions of the buffer member 1334 are not, however, limited to the illustrated examples. For example, instead of being rectangular, the buffer member 1334 may be an ellipse, or the like, extending in the transverse direction of the panel 10. The buffer member 1334 may also extend across the entire panel 10 in the transverse direction. Furthermore, a plurality of buffer members 1334 may be provided near the microphone 42. In this case, at least one buffer member 1334 is preferably in contact with the microphone 42.

By providing the above-described buffer member 1334, vibration of the lower edge of the panel 10 can be damped, and the microphone 42 can be prevented from picking up air-conducted sound or vibration sound, generated by vibration of the lower edge of the panel 10, as noise or echoes.

Figure 14:
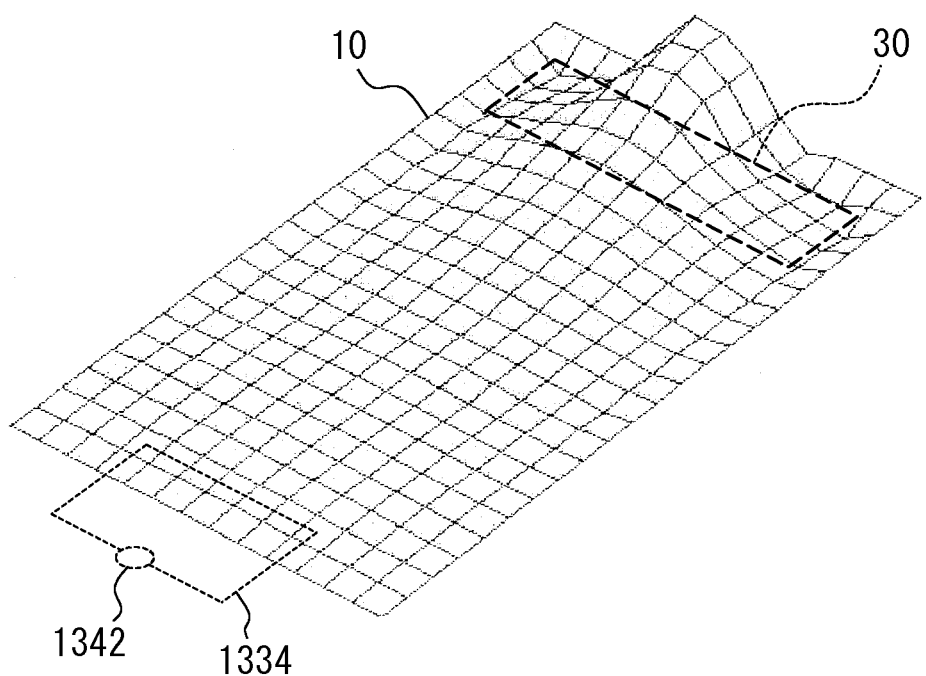
FIG. 14 illustrates an example of vibration of a panel in the electronic device according to Embodiment 5.

FIG. 14 illustrates an example of vibration of the panel 10 in the electronic device 1 according to Embodiment 5. In the electronic device 1 according to Embodiment 5, the piezoelectric element 30 is provided at the upper part of the panel 10, and the display 20 is attached to the panel 10. Therefore, it is more difficult for the lower part of the panel 10 to vibrate as compared to the upper part of the panel 10 where the piezoelectric element 30 is attached. As a result, at the lower part of the panel 10, sound leakage due to vibration of the lower part of the panel 10 is reduced. Furthermore, vibration in the panel 10 can be damped near the microphone 42. As a result, coupled with the action of the buffer member 1334, this structure allows for a reduction in noise or echoes picked up by the microphone 42.

In the electronic device 1 according to the present embodiment, the panel 10 thus deforms in conjunction with deformation of the piezoelectric element 30 attached to the back face of the panel 10, so that air-conducted sound and vibration sound are transmitted to an object that contacts the deforming panel 10. As a result, air-conducted sound and vibration sound can be transmitted to the user without projecting the vibrating body from the outer surface of the housing 60, thereby improving usability over the electronic device disclosed in Patent Literature 1, in which a vibrating body extremely small as compared to the housing is pressed against a human body. The piezoelectric element 30 also does not damage easily, since the user's ear need not be pressed against the piezoelectric element itself. Moreover, causing the housing 60 rather than the panel 10 to deform makes it easier for the user to drop the terminal when vibration is generated, whereas vibrating the panel 10 makes such dropping of the terminal unlikely.

The piezoelectric element 30 is joined to the panel 10 by the joining member 70. The piezoelectric element 30 can thus be attached to the panel 10 in a way that avoids restricting the degree of freedom for deformation of the piezoelectric element 30. The joining member 70 may be a non-heat hardening adhesive. Such adhesive has the advantage that, during hardening, thermal stress contraction does not easily occur between the piezoelectric element 30 and the panel 10. The joining member 70 may also be double-sided tape. Such tape has the advantage that the contraction stress when using adhesive is not easily produced between the piezoelectric element 30 and the panel 10.

Embodiment 6

Figure 15A:
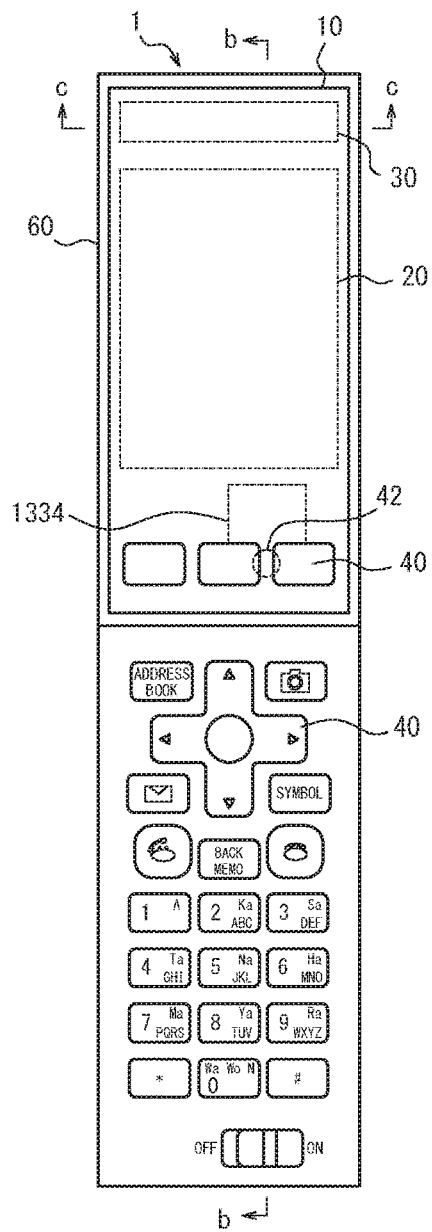
FIGS. 15A, 15B, and 15C illustrate a housing structure of the electronic device according to Embodiment 6.
Figure 15B:
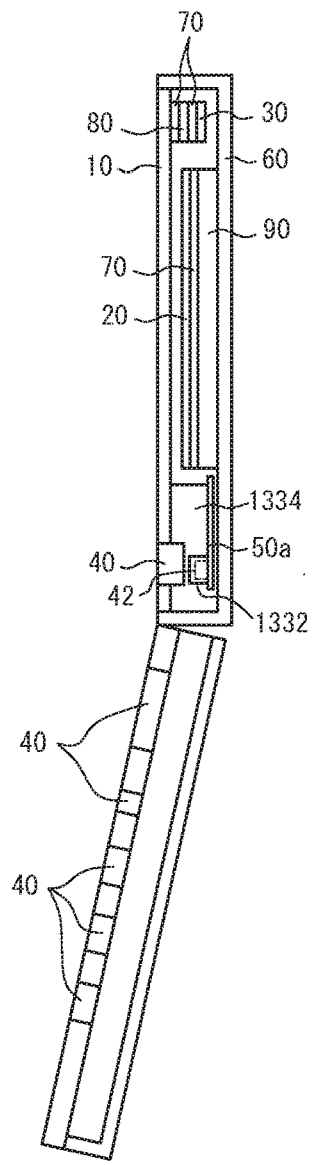
Figure 15C:
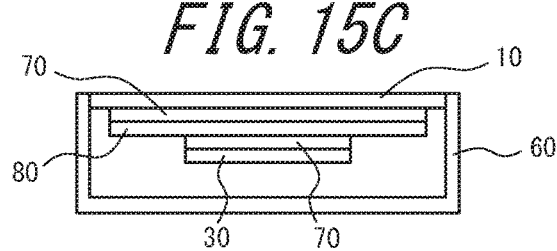

FIGS. 15A to 15C illustrate a housing structure of the electronic device 1 according to Embodiment 6. FIG. 15A is a front view, FIG. 15B is a cross-sectional view along the b-b line of FIG. 15A, and FIG. 15C is a cross-sectional view along the c-c line of FIG. 5A. The electronic device 1 illustrated in FIGS. 15A to 15C is a clamshell mobile phone in which a cover panel (an acrylic plate) protecting the display 20 is disposed on the front face at the upper side of the housing 60 as the panel 10. In Embodiment 6, a reinforcing member 80 is disposed between the panel 10 and the piezoelectric element 30. The reinforcing member 80 is, for example, a resin plate, sheet metal, or a resin plate including glass fiber. In other words, in the electronic device 1 according to Embodiment 6, the piezoelectric element 30 and the reinforcing member 80 are adhered by the joining member 70, and furthermore the reinforcing member 80 and the panel 10 are adhered by the joining member 70. Furthermore, in Embodiment 6, the display 20 is not adhered to the panel 10, but rather is supported by the housing 60. In other words, in the electronic device 1 according to Embodiment 6, the display 20 is separated from the panel 10 and is joined to a support 90, which is a portion of the housing 60, by the joining member 70. The support 90 is not limited to being a portion of the housing 60 and may be configured using metal, resin, or the like to be a member independent from the housing 60.

In the structure illustrated in FIGS. 15A through 15C, even when the microphone 42 is provided in the housing 60, either or both of the buffer member 1334 and the sound insulation wall 1332 can be provided, as in Embodiment 5. The microphone 42 is provided at the lower edge of the panel 10, i.e. near the edge opposite the upper edge where the piezoelectric element 30 is fixed. Since the gap between push-buttons and the housing 60 is used as a sound pickup hole, the microphone 42 is disposed between adjacent push-buttons. The microphone 42 is mounted on the board 50a. Furthermore, the sound insulation wall 1332 is illustrated surrounding the microphone 42. Near the microphone 42 on the board 50a, the buffer member 1334 is disposed so as to be in contact with the lower edge of the panel 10. With this structure, vibration of the panel 10 can be damped, and noise or echoes picked up by the microphone 42 can be reduced.

Figure 16:
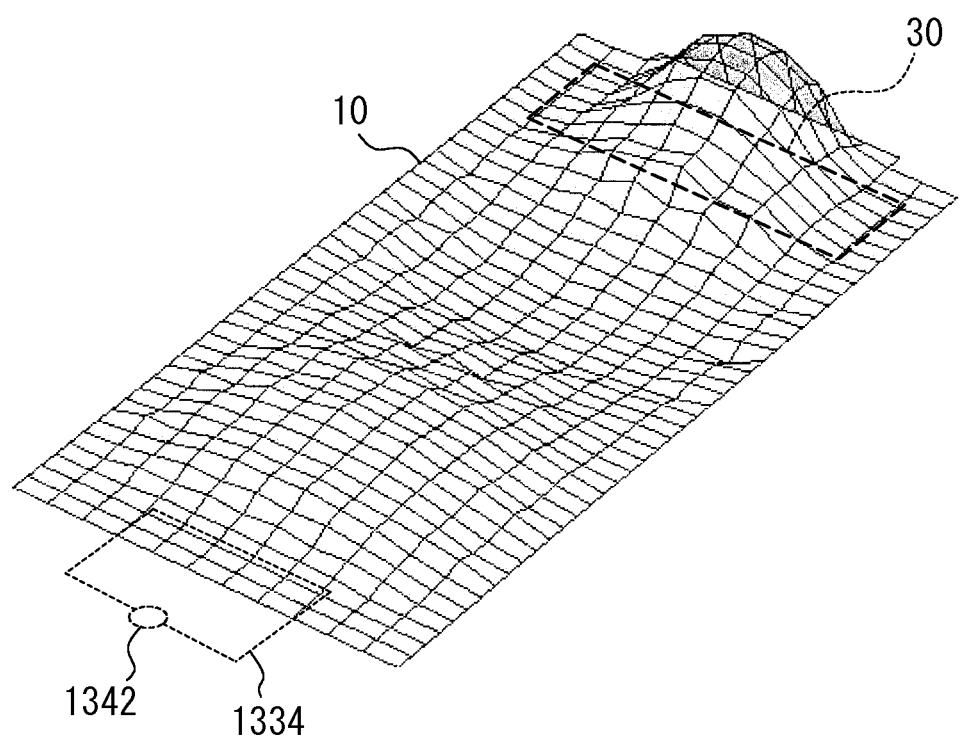
FIG. 16 illustrates an example of vibration of a panel in the electronic device according to Embodiment 6.

FIG. 16 illustrates an example of vibration of the panel 10 in the electronic device 1 according to Embodiment 6. In the electronic device 1 according to Embodiment 6, the panel 10 is an acrylic plate with lower rigidity than a glass plate, and the display 20 is not adhered to the back face of the panel 10. Therefore, as compared to the electronic device 1 according to Embodiment 5 illustrated in FIG. 14, the amplitude produced by the piezoelectric element 30 is greater. Moreover, the panel 10 vibrates not only in the region in which the piezoelectric element 30 is attached, but also in a region separate from the attachment region. Therefore, in addition to air-conducted sound, the user can hear vibration sound by contacting the ear to any position on the panel 10. In this case as well, coupled with the action of the buffer member 1334, this structure allows for an effective reduction in noise or echoes picked up by the microphone 42.

In all of the above-described examples, the piezoelectric element may be disposed at and fixed to the upper edge of the housing instead of the upper edge of the panel. In this case, the corner of the upper edge of the housing, for example, may be vibrated so that a vibration sound is heard by having the corner vibrate the tragus. With this structure as well, noise produced by vibration can be reduced, as can wobbling, by providing a buffer member on a board disposed within the housing near the microphone.

Figure 17:
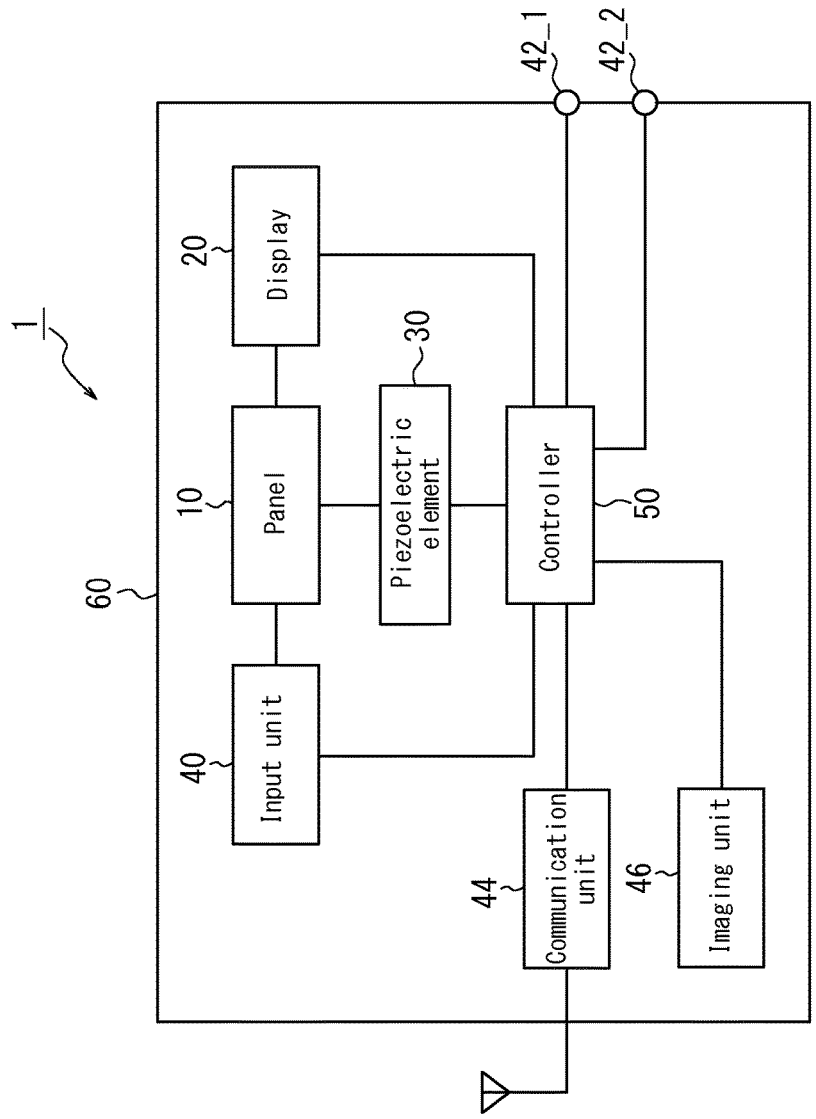
FIG. 17 is a functional block diagram of an electronic device according to another embodiment.

Other embodiments of the present invention are described below in detail with reference to the accompanying drawings. FIG. 17 is a functional block diagram of an electronic device 1 according to another embodiment of the present invention. The electronic device 1 is, for example, a mobile phone (smartphone) and is provided with a panel 10, a display 20, a piezoelectric element 30, an input unit 40, microphones 42_1 and 42_2, a communication unit 44, an imaging unit 46, and a controller 50.

The panel 10 is a touch panel that detects contact or is a cover panel or the like that protects the display 20. The panel 10 is, for example, made from glass or a synthetic resin such as acrylic or the like. The panel 10 is preferably plate-like in shape. The panel 10 may be a flat plate or may be a curved panel, the surface of which is smoothly inclined. When the panel 10 is a touch panel, the panel 10 detects contact by the user's finger, a pen, a stylus pen, or the like. Any detection system may be used in the touch panel, such as a capacitive system, a resistive film system, a surface acoustic wave system (or an ultrasonic wave system), an infrared system, an electromagnetic induction system, a load detection system, or the like.

The display 20 is a display device such as a liquid crystal display, an organic EL display, an inorganic EL display, or the like. The display 20 is provided on the back face of the panel 10. The display 20 may be disposed at a distance from the panel 10 and supported by the housing of the electronic device 1. In a preferred example, the display 20 is joined on the back face of the panel 10 by a joining member (for example, adhesive). For example, the joining member is elasticity resin, such as optical elasticity resin, that controls the index of refraction of transmitted light. The display 20 displays a variety of information through the joining member and the panel 10. By joining the display 20 to the back face of the panel 10, the amount by which vibration of the panel 10 is damped can be adjusted, as described below.

The piezoelectric element 30 is formed by elements that, upon application of an electric signal (voltage), either expand and contract or bend in accordance with the electromechanical coupling coefficient of their constituent material. Ceramic or crystal elements, for example, may be used. The piezoelectric element 30 may be a unimorph, bimorph, or laminated piezoelectric element. Examples of a laminated piezoelectric element include a laminated bimorph element with layers of bimorph (for example, 16 or 24 layers). Such a laminated piezoelectric element may be configured with a laminated structure formed by a plurality of dielectric layers composed of, for example, lead zirconate titanate (PZT) and electrode layers disposed between the dielectric layers. Unimorph expands and contracts upon the application of an electric signal (voltage), and bimorph bends upon the application of an electric signal (voltage).

The piezoelectric element 30 is disposed on the back face of the panel 10 (the face on the inner side of the electronic device 1). The piezoelectric element 30 is attached to the panel 10 by a joining member (for example, double-sided tape). The piezoelectric element 30 may be attached to the panel 10 with an intermediate member (for example, sheet metal) therebetween. Once disposed on the back face of the panel 10, the piezoelectric element 30 is separated from the inner surface of a housing 60 by a predetermined distance. The piezoelectric element 30 is preferably separated from the inner surface of the housing 60 by the predetermined distance even when expanding and contracting or bending. In other words, the distance between the piezoelectric element 30 and the inner face of the housing 60 is preferably larger than the maximum amount of deformation of the piezoelectric element 30.

The input unit 40 accepts operation input from the user and may be configured, for example, using operation buttons (operation keys). Note that when the panel 10 is a touch panel, the panel 10 can also accept operation input from the user by detecting contact by the user.

The controller 50 is a processor that controls the electronic device 1. The controller 50 applies a predetermined electric signal (a voltage corresponding to an audio signal) to the piezoelectric element 30. The voltage that the controller 50 applies to the piezoelectric element 30 may, for example, be ±15 V. This is higher than ±5 V, i.e. the applied voltage of a so-called panel speaker for conduction of sound by air-conducted sound rather than vibration sound. In this way, even if the user presses the panel 10 against the user's body with a force of 3 N or greater (for example, a force of 5 N to 10 N), sufficient vibration is generated in the panel 10, so that a vibration sound can be generated via a part of the user's body. Note that the magnitude of the applied voltage used may be appropriately adjusted in accordance with the fixation strength of the panel 10 with respect to the housing or a support member, or in accordance with the performance of the piezoelectric element 30.

Upon the controller 50 applying the electric signal to the piezoelectric element 30, the piezoelectric element 30 expands and contracts or bends in the longitudinal direction. At this point, the panel 10 to which the piezoelectric element 30 is attached deforms in conjunction with the expansion and contraction or bending of the piezoelectric element 30. The panel 10 thus vibrates. Therefore, along with generating air-conducted sound, the panel 10 generates vibration sound via a part of the user's body when the user brings a part of the body (such as the cartilage of the outer ear) into contact. The controller 50 can apply an electric signal, for example corresponding to an audio signal received by the communication unit 44 and related to the other party's voice, to the piezoelectric element 30 to generate air-conducted sound and vibration sound that correspond to the audio signal. The audio signal may be related to ringtones, music including songs, or the like. Note that the audio signal pertaining to the electric signal may be based on music data stored in internal memory of the electronic device 1, or may be music data stored on an external server or the like and played back over a network.

The communication unit 44 receives a baseband signal by wireless communication from the electronic device of the other party and extracts an audio signal. The extracted audio signal is output by the controller 50 from the panel 10 as air-conducted sound and vibration sound. The communication unit 44 also converts the audio signal picked up by the microphone 42_1 into a baseband signal and transmits the baseband signal to the electronic device of the other party.

The microphone 42_1 serves, for example, as a first microphone to pick up speech from the user and convert the speech to an audio signal input into the controller 50. The microphone 42_2 serves, for example, as a second microphone to pick up ambient sound and convert the ambient sound to an audio signal input into the controller 50. In this case, the controller 50 performs noise canceling by subtracting the ambient sound picked up by the second microphone 42_2 from the audio picked up by the first microphone 42_1.

The imaging unit 46 is, for example, an image sensor such as a Charge Coupled Device (CCD) or a Complementary MOS (CMOS) and includes a signal processing circuit that processes pixel signals generated by imaging. The imaging unit 46 captures an image in response to a control signal from the input unit 40 and transmits captured image data to the controller 50. The controller 50 performs operations such as outputting the captured image data to the display 20 and storing the captured image data in a storage medium internal to or mounted on the electronic device 1.

The panel 10 vibrates not only in the region in which the piezoelectric element 30 is attached, but also in a region separate from the attachment region. In the region of vibration, the panel 10 includes a plurality of locations at which the panel 10 vibrates in a direction intersecting the surface of the panel 10. At each of these locations, the value of the vibration amplitude changes over time from positive to negative or vice-versa. At a given instant during vibration of the panel 10, portions with a relatively large vibration amplitude and portions with a relatively small vibration amplitude appear to be distributed randomly or cyclically over a large region of the panel 10. In other words, a plurality of vibration waves can also be made to be detected over a large region (for example, nearly the entirety) of the panel 10. The voltage that the controller 50 applies to the piezoelectric element 30 may be ±15 V to prevent damping of the above-described vibration of the panel 10 even if the user presses the panel 10 against the user's body with a force of, for example, 5 N to 10 N. Therefore, the user can hear sound by contacting a region distant from the above-described attachment region of the panel 10 to the ear. Note that the description in FIG. 2 applies with regard to a suitable shape and the like of the panel 10.

Embodiment 7

FIGS. 18A to 18C illustrate a housing structure of the electronic device 1 according to Embodiment 7. FIG. 18A is a front view, FIG. 18B is a back view, and FIG. 18C is a cross-sectional view along the b-b line of FIGS. 18A and 18B. The electronic device 1 illustrated in FIGS. 18A to 18C is a smartphone in which a touch panel that is a glass plate is disposed on the front face of the housing 60 (for example a metal or resin case) as the panel 10. The front face illustrated in FIG. 18A corresponds to the "first face" of the housing 60, and the back face illustrated in FIG. 18B corresponds to the "second face".

The panel 10 and the input unit 40 are supported by the housing 60, and the display 20 and piezoelectric element 30 are each adhered to the panel 10 by a joining member 70. The joining member 70 is adhesive with thermosetting properties, ultraviolet curable properties, or other such properties; double-sided tape; or the like. The joining member 70 may, for example, be optical elasticity resin, which is clear and colorless acrylic ultraviolet curing adhesive. The panel 10, display 20, and piezoelectric element 30 are each generally rectangular. The controller 50 is mounted on a circuit board 50a provided facing the back face of the panel 10 and the display 20.

The display 20 is disposed in approximately the center in the transverse direction of the panel 10. The piezoelectric element 30 is disposed at a predetermined distance from an edge of the panel 10 in the longitudinal direction, near the edge so that the longitudinal direction of the piezoelectric element 30 is aligned with the short sides of the panel 10. The display 20 and the piezoelectric element 30 are disposed side by side, in parallel directions, on the inner face of the panel 10.

The microphone 42_1 is mounted on a mounting unit 43_1, and along with the mounting unit 43_1, is disposed at and fixed to the lower part of the panel 10 at the front face of the housing 60. At this position, the microphone 42_1 functions as the first microphone that picks up audio produced by the user. On the other hand, the microphone 42_2 is mounted on a mounting unit 43_2, and along with the mounting unit 43_2, is disposed at and fixed to the back face of the housing 60. At this position, the microphone 42_2 functions as a second microphone to pick up ambient sound. The mounting units 43_1 and 43_2 are each formed from a material such as resin, metal, or the like as separate bodies from the housing 60. A hole for picking up sound (sound transmission hole) 1842a is provided in each of the mounting units 43_1 and 43_2. The sound transmission hole 1842a is provided with waterproofing by a waterproof sheet omitted from the drawings (for example, Gore-Tex (registered trademark)). The microphones 42_1 and 42_2 each pick up sound through the sound transmission hole 1842a. The microphones 42_1 and 42_2 are connected to the circuit board 50a within the housing 60.

The microphones 42_1 and 42_2 are respectively mounted on the mounting units 43_1 and 43_2, and the mounting units 43_1 and 43_2 are fixed onto the housing 60. As a result, when the panel 10 vibrates due to the piezoelectric element 30, the vibration transmitted from the panel 10 to the housing 60 is damped by traversing the mounting units 43_1 and 43_2, which are separate bodies from the housing 60, and therefore is less easily transmitted directly to the microphones 42_1 and 42_2. Accordingly, abnormal noise generated by vibration of the housing 60 and of the portion surrounding the microphones can be suppressed, as can leakage of speech. Noise or echoes of speech picked up by the microphones 42_1 and 42_2 can thus be reduced. Due to the above effect, the microphone 42_2 serving as a second microphone can efficiently pick up the ambient sound that should be picked up, without this ambient sound being buried in vibration sound of the housing 60 or the like. Hence, noise cancellation processing can be performed accurately.

Furthermore, a buffer 1845 is preferably provided between the mounting units 43_1 and 43_2 and the housing 60. The buffer 1845 is, for example, made of rubber. In this way, the vibration transmitted from the housing 60 to the mounting units 43_1 and 43_2 can be even further damped. Noise or echoes of speech picked up by the microphones 42_1 and 42_2 can thus be reduced.

FIG. 18C illustrates an example of disposing the mounting unit 43_2 at the upper part 60a of the housing 60. The mounting unit 43_2 is thus shifted from the position where the user's hand holds the housing 60, making this arrangement preferable for picking up ambient sound. The mounting unit 43_2 may also, however, be disposed at the lower part 60b of the housing 60. In this context, the upper part 60a and the lower part 60b of the housing 60 are defined using the center point along the length of the housing 60 in the longitudinal direction as a boundary. For example, the piezoelectric element 30 may be provided in the upper part 60a. Conversely, the mounting unit 43_2 may be provided at the lower part 60b on the back face of the housing 60. In this case, the distance can be increased from the piezoelectric element 30, which is the source of vibration, thus achieving the effect of further damping vibration transmitted from the panel 10 across the housing before the vibration reaches the mounting unit 43_2.

Note that the imaging unit 46 may be mounted on the mounting unit 43_2. In this way, the component for fixing the imaging unit 46 to the housing 60 can be shared, thereby reducing the number of components and lowering costs. Furthermore, by mounting the imaging unit 46, the rigidity of the mounting unit 43_2 as a whole can be increased, and vibration can be damped even further.

Figure 19:
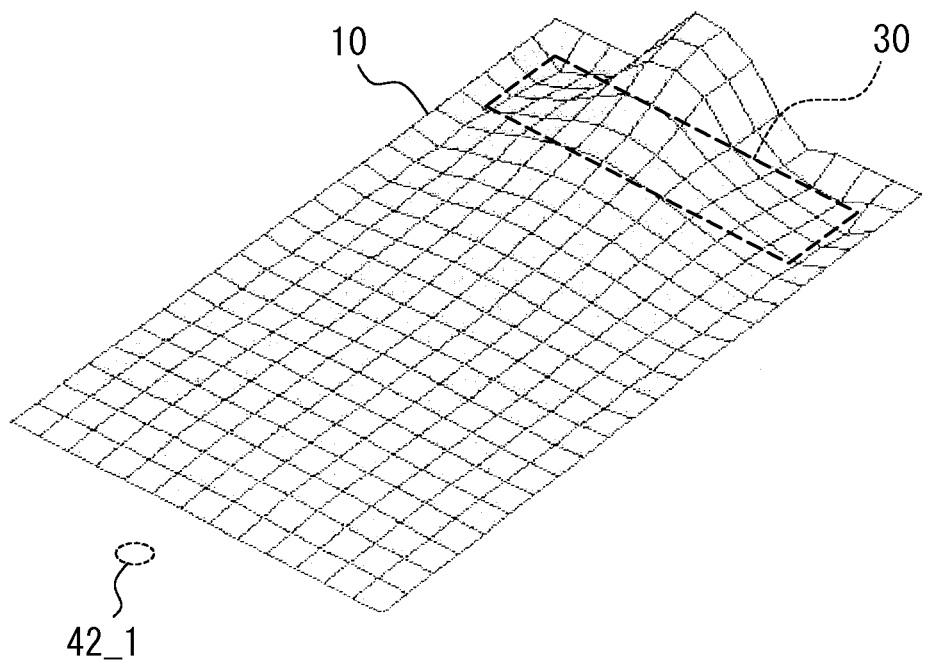
FIG. 19 illustrates an example of vibration of a panel in the electronic device according to Embodiment 7.

FIG. 19 illustrates an example of vibration of the panel 10 in the electronic device 1 according to Embodiment 7. In the electronic device 1 according to Embodiment 7, the piezoelectric element 30 is provided at the upper part of the panel 10, and the display 20 is attached to the panel 10. Therefore, it is more difficult for the lower part of the panel 10 to vibrate as compared to the upper part of the panel 10 where the piezoelectric element 30 is attached. As a result, at the lower part of the panel 10, sound leakage due to vibration of the lower part of the panel 10 is reduced. Furthermore, vibration in the panel 10 can be sufficiently damped near the microphone 42_1. As a result, noise or echoes picked up by the microphone 42_1 can be reduced.

In the electronic device 1 according to the present embodiment, the panel 10 thus deforms in conjunction with deformation of the piezoelectric element 30 attached to the back face of the panel 10, so that air-conducted sound and vibration sound are transmitted to an object that contacts the deforming panel 10. As a result, air-conducted sound and vibration sound can be transmitted to the user without projecting the vibrating body from the outer surface of the housing 60, thereby improving usability over the electronic device disclosed in Patent Literature 1, in which a vibrating body extremely small as compared to the housing is pressed against a human body. The piezoelectric element 30 also does not damage easily, since the user's ear need not be pressed against the piezoelectric element itself. Moreover, causing the housing 60 rather than the panel 10 to deform makes it easier for the user to drop the terminal when vibration is generated, whereas vibrating the panel 10 makes such dropping of the terminal unlikely.

The piezoelectric element 30 is joined to the panel 10 by the joining member 70. The piezoelectric element 30 can thus be attached to the panel 10 in a way that avoids restricting the degree of freedom for deformation of the piezoelectric element 30. The joining member 70 may be a non-heat hardening adhesive. Such adhesive has the advantage that, during hardening, thermal stress contraction does not easily occur between the piezoelectric element 30 and the panel 10. The joining member 70 may also be double-sided tape. Such tape has the advantage that the contraction stress when using adhesive is not easily produced between the piezoelectric element 30 and the panel 10.

Embodiment 8

FIGS. 20A to 20C illustrate a housing structure of the electronic device 1 according to Embodiment 8. FIG. 20A is a front view, FIG. 20B is a cross-sectional view along the b-b line of FIG. 20A, and FIG. 20C is a cross-sectional view along the c-c line of FIG. 20A. The electronic device 1 illustrated in FIGS. 20A to 20C is a clamshell mobile phone in which a cover panel (for example an acrylic plate) protecting the display 20 is disposed on the front face at the upper side of the housing 60 as the panel 10. In Embodiment 8, a reinforcing member 80 is disposed between the panel 10 and the piezoelectric element 30. The reinforcing member 80 is, for example, a resin plate, sheet metal, or a resin plate including glass fiber. In other words, in the electronic device 1 according to Embodiment 8, the piezoelectric element 30 and the reinforcing member 80 are adhered by the joining member 70, and furthermore the reinforcing member 80 and the panel 10 are adhered by the joining member 70. Furthermore, in Embodiment 8, the display 20 is not adhered to the panel 10, but rather is supported by the housing 60. In other words, in the electronic device 1 according to Embodiment 8, the display 20 is separated from the panel 10 and is joined to a support 90, which is a portion of the housing 60, by the joining member 70. The support 90 is not limited to being a portion of the housing 60 and may be configured using metal, resin, or the like to be a member independent from the housing 60.

FIGS. 20A to 20C illustrate a microphone 42_2 disposed on the back face of the housing 60 as a second microphone. A first microphone 42_1 is, for example, provided in a foldable housing 61 that forms a pair with the housing 60. As an Embodiment 7, the microphone 42_2 is mounted on a mounting unit 43_2 and fixed to the housing 60. A buffer 1845 is more preferably provided between the mounting unit 43_2 and the housing 60. With this structure, the microphone 42_2 can pick up ambient sound while reducing pickup of noise or echoes coming from the housing 60, thus allowing for efficient noise canceling.

Figure 21:
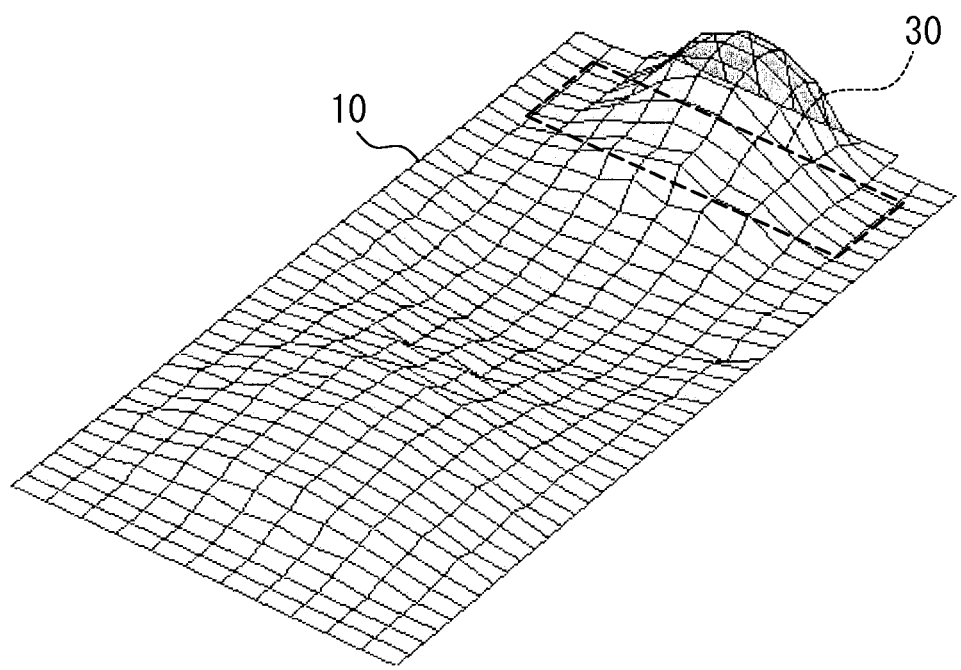
FIG. 21 illustrates an example of vibration of a panel in the electronic device according to Embodiment 8.

FIG. 21 illustrates an example of vibration of the panel 10 in the electronic device 1 according to Embodiment 8. In the electronic device 1 according to Embodiment 8, the panel 10 is an acrylic plate with lower rigidity than a glass plate, and the display 20 is not adhered to the back face of the panel 10. Therefore, as compared to the electronic device 1 according to Embodiment 7 illustrated in FIG. 19, the amplitude produced by the piezoelectric element 30 is greater. Moreover, the panel 10 vibrates not only in the region in which the piezoelectric element 30 is attached, but also in a region separate from the attachment region. Therefore, in addition to air-conducted sound, the user can hear vibration sound by contacting the ear to any position on the panel 10.

Although the present invention has been described based on embodiments and the accompanying drawings, it is to be noted that various changes and modifications will be apparent to those skilled in the art based on the present disclosure. Therefore, such changes and modifications are to be understood as included within the scope of the present invention. For example, the functions and the like included in the various members and steps may be reordered in any logically consistent way. Furthermore, components or steps may be combined into one or divided.

REFERENCE SIGNS LIST

1: Electronic device
10: Panel
20: Display
30: Piezoelectric element
31: Buffer
32: Sound insulation wall
34: Rib
36: Vibration absorption member
40: Input unit
42, 42_1, 42_2: Microphone
50: Controller
60: Housing
70: Joining member
80: Reinforcing member
90: Support
932, 1332: Sound insulation wall
932a: Duct
942a, 1842a: Sound transmission hole
1334: Buffer member
1845: Buffer

The invention claimed is:

1. An electronic device comprising:
a piezoelectric element;
a panel, the piezoelectric element being attached thereto, the panel vibrating due to the piezoelectric element to generate a vibration sound transmitted by vibrating a part of a human body;
a housing supporting the panel with a first face;
a microphone contained within the housing and disposed on a second face differing from the first face; and
a buffer damping vibration transmitted from the panel to the microphone through the first face and/or the second face, wherein
a portion of the panel that rises highest in a thickness direction of the panel is located immediately above the piezoelectric element,
a first side of a first portion of the buffer faces the microphone,
a second side of the first portion of the buffer is in contact with the second face, and
a second portion of the buffer is in contact with the first face and/or the second face.

2. The electronic device according to claim 1, wherein the first face and the second face oppose each other, and the second portion of the buffer includes a rib provided within the housing and extending in a direction intersecting a direction from a first side of the housing where the panel is provided to a second side of the housing where the microphone is provided.

3. The electronic device according to claim 2, wherein along a direction from the first side to the second side, the piezoelectric element is attached to the panel closer to the first side.

4. The electronic device according to claim 2, wherein
a length of the panel in a direction from the first side to the second side is equal to or greater than a length from an antitragus to an inferior antihelix crus.

5. The electronic device according to claim 2, wherein
a length of the panel in a direction intersecting a direction from the first side to the second side is equal to or greater than a length from a tragus to an antihelix.

6. The electronic device according to claim 1, wherein
the first portion of the buffer includes a vibration absorption member within the housing, between the microphone and the second face.

7. The electronic device according to claim 1, further comprising
a sound insulation wall provided within the housing and surrounding the microphone.

8. The electronic device according to claim 1, wherein
the panel includes a display disposed closer to the microphone, in plan view, from a position of attachment of the piezoelectric element.

9. The electronic device according to claim 8, wherein
a portion in the panel where the piezoelectric element is joined is positioned outside of a region where the panel and the display overlap.

10. The electronic device according to claim 1, wherein
the piezoelectric element is joined to the panel by a joining member.

11. The electronic device according to claim 10, wherein
the joining member is a non-heat hardening adhesive material.

12. The electronic device according to claim 10, wherein
the joining member is double-sided tape.

13. The electronic device according to claim 1, wherein
the panel is joined to the housing by a joining member.

14. The electronic device according to claim 13, wherein
the joining member is a non-heat hardening adhesive material.

15. The electronic device according to claim 13, wherein
the joining member is double-sided tape.

16. The electronic device according to claim 1, wherein
the panel forms a portion or an entirety of any one of a display, an input unit, and a cover for a display.

17. The electronic device according to claim 1, wherein
the panel generates the vibration sound and an air-conducted sound.

18. An electronic device comprising:
a piezoelectric element;
a panel vibrating due to the piezoelectric element to generate a vibration sound transmitted by vibrating a part of a human body;
a housing supporting the panel;
a microphone mounted near a first edge of the panel on a board in the housing;
a buffer member, disposed on the board near the microphone, in contact with the first edge of the panel and buffering vibration of the first edge; and
a sound insulation wall provided within the housing and surrounding the microphone, wherein
the buffer member is adhered to the board and the sound insulation wall, and
a portion of the panel that rises highest in a thickness direction of the panel is located immediately above the piezoelectric element.

19. The electronic device according to claim 18, wherein
a position of attachment of the piezoelectric element on the panel or the housing is near a second edge opposite the first edge.

20. The electronic device according to claim 19, wherein
a length of the panel in a direction from the first edge to the second edge is equal to or greater than a length from an antitragus to an inferior antihelix crus.

21. The electronic device according to claim 19, wherein
a length of the panel in a direction intersecting a direction from the first edge to the second edge is equal to or greater than a length from a tragus to an antihelix.

22. The electronic device according to claim 18, wherein
the buffer member is not adhered to the first edge of the panel.

23. The electronic device according to claim 18, wherein
the buffer member is made of foam rubber.

24. The electronic device according to claim 18, wherein
the panel includes a display disposed closer to the microphone, in plan view, from a position of attachment of the piezoelectric element.

25. The electronic device according to claim 18, wherein
the piezoelectric element is joined to the panel by a joining member.

26. The electronic device according to claim 25, wherein
the joining member is a non-heat hardening adhesive material.

27. The electronic device according to claim 25, wherein
the joining member is double-sided tape.

28. The electronic device according to claim 25, wherein
a portion in the panel where the piezoelectric element is joined is positioned outside of a region where the panel and a display overlap.

29. The electronic device according to claim 18, wherein
the panel is joined to the housing by a joining member.

30. The electronic device according to claim 29, wherein
the joining member is a non-heat hardening adhesive material.

31. The electronic device according to claim 29, wherein
the joining member is double-sided tape.

32. The electronic device according to claim 18, wherein
the panel forms a portion or an entirety of any one of a display, an input unit, and a cover for a display.

33. The electronic device according to claim 18, wherein
the panel generates the vibration sound and an air-conducted sound.

34. An electronic device comprising:
a piezoelectric element having a longitudinal direction;
a panel, the piezoelectric element being attached thereto, the panel vibrating due to the piezoelectric element to generate a vibration sound transmitted by vibrating a part of a human body;
a housing supporting the panel with a first face;
a microphone contained within the housing and disposed on a second face differing from the first face; and
a buffer damping vibration transmitted from the panel to the microphone through the first face and/or the second face, wherein
a portion of the panel immediately above the piezoelectric element rises higher in a thickness direction of the panel than adjacent portions of the panel,
the piezoelectric element bends in the longitudinal direction,
a first side of a first portion of the buffer faces the microphone,
a second side of the first portion of the buffer is in contact with the second face, and
a second portion of the buffer is in contact with the first face and/or the second face.

35. An electronic device comprising:
a piezoelectric element having a longitudinal direction;
a panel vibrating due to the piezoelectric element to generate a vibration sound transmitted by vibrating a part of a human body;
a housing supporting the panel;
a microphone mounted near a first edge of the panel on a board in the housing;
a buffer member, disposed on the board near the microphone, in contact with the first edge of the panel and buffering vibration of the first edge; and
a sound insulation wall provided within the housing and surrounding the microphone, wherein
the buffer member is adhered to the board and the sound insulation wall,
a portion of the panel immediately above the piezoelectric element rises higher in a thickness direction of the panel than adjacent portions of the panel, and
the piezoelectric element bends in the longitudinal direction.

* * * * *